United States Patent
Kolios et al.

(10) Patent No.: US 9,836,923 B2
(45) Date of Patent: *Dec. 5, 2017

(54) ORDERING LOTTERY TICKETS USING MOBILE DEVICES

(71) Applicant: Intralot S.A. Integrated Lottery Systems and Services, Athens (GR)

(72) Inventors: Georgios Kolios, Athens (GR); Stamatios Sarlis, Athens (GR)

(73) Assignee: Intralot S.A. Integrated Lottery Systems and Services, Athens (GR)

( * ) Notice: Subject to any disclaimer, the term of this patent is extended or adjusted under 35 U.S.C. 154(b) by 176 days.

This patent is subject to a terminal disclaimer.

(21) Appl. No.: 14/660,343

(22) Filed: Mar. 17, 2015

(65) Prior Publication Data

US 2015/0194008 A1 Jul. 9, 2015

Related U.S. Application Data

(63) Continuation-in-part of application No. 13/483,136, filed on May 30, 2012, now Pat. No. 9,076,133, and
(Continued)

(51) Int. Cl.
*A63F 9/24* (2006.01)
*G07F 17/32* (2006.01)
(Continued)

(52) U.S. Cl.
CPC ....... *G07F 17/329* (2013.01); *G06Q 20/0453* (2013.01); *G06Q 20/3274* (2013.01);
(Continued)

(58) Field of Classification Search
CPC ..... G07F 17/32; G07F 17/3225; G07F 17/329
(Continued)

(56) References Cited

U.S. PATENT DOCUMENTS 5,223,698 A 6/1993 Kapur
7,247,095 B2 7/2007 Nulph
(Continued)

FOREIGN PATENT DOCUMENTS

KR 20040083245 A 10/2004
KR 100984244 B1 9/2010

OTHER PUBLICATIONS

International Searching Authority, The International Search Report and the Written Opinion of the International Searching Authority, or the Declaration, PCT/US2011/066082, dated Apr. 24, 2012, 10 pgs.
(Continued)

*Primary Examiner* — William H McCulloch, Jr.
*Assistant Examiner* — Chase Leichliter
(74) *Attorney, Agent, or Firm* — Wood Herron & Evans LLP

(57) ABSTRACT

A mobile application or mobile website allows a user of a mobile device to make player selections associated with the order of a lottery ticket. The mobile device then displays a machine-readable code image. When a lottery retailer scans the image, the code conveys the lottery ticket order to the retail system, allowing the retailer to sell lottery tickets corresponding with the order. The mobile application or website may record player selections for reuse, record purchased tickets to report lottery status to the player, and assist the player in locating a lottery retailer. Further, a lottery image ticket may be transmitted to the user's mobile device or to an account which can be accessed through the user's mobile device. The lottery image ticket can then be presented to the retailer equipment for winnings check and redemption.

16 Claims, 21 Drawing Sheets

Related U.S. Application Data a continuation-in-part of application No. 13/215,314, filed on Aug. 23, 2011, now Pat. No. 9,652,789.

(60) Provisional application No. 61/954,648, filed on Mar. 18, 2014.

(51) Int. Cl.
  *G06Q 50/34* (2012.01)
  *G06Q 20/04* (2012.01)
  *G06Q 20/32* (2012.01)
  *G06Q 30/06* (2012.01)

(52) U.S. Cl.
  CPC ............ *G06Q 30/06* (2013.01); *G06Q 50/34* (2013.01); *G07F 17/3218* (2013.01); *G07F 17/3225* (2013.01); *G07F 17/32* (2013.01)

(58) Field of Classification Search
  USPC ........................................ 463/16, 17, 20, 42
  See application file for complete search history.

(56) References Cited

U.S. PATENT DOCUMENTS

| | | | |
|---|---|---|---|
| 8,146,803 B1 | 4/2012 | Ramachandran et al. | |
| 8,714,445 B1* | 5/2014 | Katz | G06Q 20/042 235/379 |
| 8,931,703 B1* | 1/2015 | Mullen | G06K 19/083 235/487 |
| 9,227,136 B2 | 1/2016 | Cage et al. | |
| 9,672,697 B2 | 6/2017 | Cage et al. | |
| 2002/0042743 A1* | 4/2002 | Ortiz | G06Q 20/10 705/14.38 |
| 2003/0186734 A1 | 10/2003 | LeMay et al. | |
| 2003/0233276 A1* | 12/2003 | Pearlman | G06Q 20/3274 705/14.23 |
| 2004/0054623 A1 | 3/2004 | Collins et al. | |
| 2004/0225613 A1* | 11/2004 | Narayanaswami | G06Q 10/087 705/64 |
| 2004/0254007 A1 | 12/2004 | Reep | |
| 2004/0267663 A1 | 12/2004 | Karns et al. | |
| 2006/0217821 A1 | 9/2006 | Abraitis et al. | |
| 2008/0167060 A1 | 7/2008 | Moshir et al. | |
| 2008/0210754 A1* | 9/2008 | Lovett | G06Q 20/24 235/380 |
| 2008/0302872 A1* | 12/2008 | Tate | G06Q 30/02 235/462.07 |
| 2009/0098923 A1 | 4/2009 | Randhawa | |
| 2010/0173691 A1 | 7/2010 | Wolfe | |
| 2010/0268592 A1* | 10/2010 | Shaer | G06Q 30/02 705/14.38 |
| 2010/0325009 A1 | 12/2010 | Rajan et al. | |
| 2011/0021258 A1 | 1/2011 | Kula | |
| 2011/0032078 A1 | 2/2011 | Guziel et al. | |
| 2011/0034229 A1 | 2/2011 | Guziel et al. | |
| 2011/0065491 A1* | 3/2011 | Wolfe | G07F 17/32 463/17 |
| 2011/0165933 A1 | 7/2011 | Guziel et al. | |
| 2012/0054046 A1* | 3/2012 | Albisu | G06Q 20/20 705/16 |
| 2012/0089468 A1* | 4/2012 | Guziel | G06Q 20/20 705/16 |
| 2013/0012286 A1* | 1/2013 | Schuff | G07F 17/32 463/17 |
| 2014/0066194 A1 | 3/2014 | Cage et al. | |
| 2016/0086453 A1 | 3/2016 | Cage et al. | |

OTHER PUBLICATIONS

International Preliminary Examining Authority, International Preliminary Report on Patentability, PCT/US11/66082, dated Oct. 10, 2013, 12 pages.

United States Patent and Trademark Office, Office Action for U.S. Appl. No. 13/215,314, dated May 15, 2014, 31 pgs.

* cited by examiner

ORDERING LOTTERY TICKETS USING MOBILE DEVICES

CROSS-REFERENCE TO RELATED APPLICATIONS

This claims the benefit of U.S. Provisional Patent Application Ser. No. 61/954,648, filed Mar. 18, 2014 and is related to U.S. Provisional Application No. 61/454,595, filed Mar. 21, 2011, and a continuation in part to U.S. patent application Ser. No. 13/215,314, filed Aug. 23, 2011, and U.S. patent application Ser. No. 13/483,136, filed May 30, 2012. Each of these identified applications is hereby incorporated by reference in its entirety.

FIELD OF THE INVENTION

This invention relates to systems and methods for selling lottery tickets, and more specifically, to the sale of lottery tickets with user selected options and to the transmission of lottery image tickets to a user's mobile device.

BACKGROUND OF THE INVENTION

The ability to speed up the selling process of on-line lottery games while at the same time reducing the associated costs and facilitating such sales to lottery players has been a recognized objective in the industry. The methods and systems described hereafter are alternative ways of selling lottery games to fulfill these requirements.

Many entities, such as state governments, operate lotteries in which tickets are sold, at least one winner is selected, usually at random, and the winner is awarded a prize, typically of much greater value than the price of the ticket. Lottery organizers generally collect more in ticket sales than they pay out in prize money, resulting in a net profit for the lottery organizer. Lottery organizers have been known to employ or subcontract to others to help in the distribution of lottery tickets. For example, systems and methods of doing business have been employed in which a lottery organizer, such as a governmental entity, authorizes particular businesses, such as retail business establishments, to sell lottery tickets. In at least some instances, lottery organizers have provided machines or hardware to distributors of lottery tickets, and this hardware has been used to print lottery tickets as they are purchased by customers. Typically, expensive thermal paper is the medium used by lottery organizers due to the high speed of printing that can be achieved. Frequently, the machines used to print lottery tickets require maintenance resulting from malfunctioning thermal printheads, paper-cutters, and other hardware. While undergoing maintenance, these machines are inoperable and thus prevent potential customers from purchasing lottery tickets. It is evident that reducing or eliminating the need to print lottery tickets will result in significant cost savings by minimizing expenses related to thermal paper and printer maintenance, and by minimizing the problem of printer down-time. In addition, the reduction of paper lottery tickets contributes to preserving a natural resource and may be appealing to potential customers.

In some cases, customers can choose their own lottery ticket numbers, which are entered into the hardware, either by the customer or by a clerk employed by the business. These selections by the customer are typically written on a play slip and such information is imaged, scanned or manually entered to facilitate the purchase of the desired ticket. In some cases, hardware that is used to print or distribute lottery tickets has been connected through a network to a central location and information regarding the lottery tickets that are purchased has been sent to the central location through the network. This information may include, for example, identification numbers of the lottery tickets that have been purchased, a quantity or monetary value of tickets sold, or both.

However, customers typically must come to a distributor of lottery tickets and fill out a play slip to purchase their lottery tickets. This creates an added inconvenience, obstacle, or cost for customers, which may be a significant burden for customers who are busy, in a rush or are distant from distributors of lottery tickets. As a result, lottery organizers may not sell as many lottery tickets as they otherwise might absent the difficulties of filling out the play slips or inconvenience of customers traveling to lottery ticket distributors. In addition, brick and mortar lottery ticket distributors typically require expensive hardware, facilities and employees which add cost to the distribution of lottery tickets and the distribution of lottery tickets through such distributors may take away from the opportunity to distribute other goods or services through such facilities and businesses. As a result, needs and potential for benefit exist for systems and methods of distributing lottery tickets that do not require (e.g., as much hardware dedicated at the) physical brick and mortar distribution centers, that are conducive to automation, that cost less to implement, require less overhead, require less time to complete a ticket purchase, are more reliable, are easier for customers to use, for example, than prior art systems and methods for distributing lottery tickets.

Also in the past, but generally in unrelated businesses and other human activities, mobile telephones have been used for various purposes including as tools for the distribution of a variety of goods and services. Mobile phones have been used to communicate between various people, even when they are not at their home or office, including people who are engaged in the distribution of various goods and services. Mobile phones have been used, for example, for audio phone conversations, for recreational purposes, for sending text messages, for instance, short message service (SMS) messages, to leave voice messages, and to send pictures, as examples. In addition, certain mobile phones have provisions for distribution or purchasing of various goods and services. In addition, some mobile phones offer Internet access, and the Internet could be used widely for the distribution of goods and services. In addition, the Internet has been used for a variety of gambling activities specifically, including selling lottery tickets. Accordingly, needs and potential for benefit exist for systems and methods for distributing lottery tickets in a manner that is more convenient for customers, for example, using mobile phones, and personal electronic devices. Needs and potential for improvement exists for systems and methods for distributing lottery tickets that facilitate automation, require less use of real estate and hardware, require less use of paper, require fewer employees, are more reliable, are less time consuming or the like.

SUMMARY OF THE INVENTION

Methods and systems according to this invention address these and other problems in the prior art by allowing a user to make player selections on his or her mobile device, which then displays a machine-readable code image which can be scanned by a retailer to order a lottery ticket. After an order is placed in this manner, a lottery image ticket may be transmitted to the user's mobile device, email account or to a lottery or other account which can be accessed through the user's mobile device. Moreover, in another aspect of this invention, this lottery image ticket—in case it is a winning one—is used for the player to perform a winning check and redemption of any associated winnings.

In one embodiment, a method of filling an order for a lottery ticket includes reading a machine-readable code image to identify a code that represents an order for a lottery ticket including at least one player selection and selling a lottery ticket having player selections matching the player selections included in the order. The code image may be a QR code image, barcode image, or other known code image for use with an optical scanner. The code image may be displayed on a mobile device that produces the code image in response to selections made on the mobile device by the purchaser of the ticket. Selling the lottery ticket may include the same steps as selling a lottery ticket to a consumer completing a paper lottery order form although in a more user-friendly, efficient and expedient manner. The method may further include transmitting a lottery image ticket to the player via an email, a Multimedia Messaging Service (MMS) message, or the player's lottery account. In addition, a payment receipt may be sent to the player, and the player may be informed of his or her winnings via an email, an MMS message, or the player's lottery account.

In another embodiment, a lottery ticket retail system includes an optical scanner operable to read a machine-readable code image and a computer operable to receive data from the optical scanner and associate the received data with an order for a lottery image ticket and at least one player selection for that ticket. The computer is further operable to communicate a sale of a lottery ticket corresponding with the order to a lottery system associated with the sold ticket. The system may also include a lottery ticket printer operable to print a lottery ticket corresponding with the order. In addition, or alternatively, the computer may be operable to handle at least one of a lottery image ticket, a payment receipt, and a notification of a player's winnings to a player's email address, phone number, or lottery account.

In another embodiment, a method for generating a lottery ticket order includes generating and displaying a user interface allowing a player to make the player selections associated with a type of lottery ticket; receiving input from a player corresponding to the player selections for the lottery ticket; and generating and displaying a machine-readable code image representing an order for the lottery ticket including the player selections. The method may further include recording the player selections and, when subsequently generating and displaying the user interface for the same type of lottery ticket, generating and displaying the recorded selections. The method may also include installing a mobile application on a mobile device and executing the mobile application. The mobile application may carry out the steps of generating and displaying the user interface, receiving input from the player, and generating and displaying the machine-readable code image. The mobile application may facilitate the player selection of his/her preferred method for receiving the lottery image tickets, receipts or winning notification. The player can specify an email address, a phone number for receiving SMS or a lottery account.

Alternatively, the method may include accessing a mobile website from an internet client on a mobile device; displaying a first web page associated with the mobile website, the first web page including the user interface; communicating data associated with the input from the player to a web server; and displaying a second web page associated with the mobile website, the second web page including the machine-readable code image. The method may further include communicating with a lottery system that is tracking and authorizing the sale of lottery tickets. Another web page pay facilitate the player selection of his/her preferred method or receiving the lottery image tickets, receipts or winning notification. Player can specify an email address, a phone number for receiving SMS or a lottery account.

In another embodiment, a method for facilitating and tracking a lottery ticket order includes receiving information uniquely identifying a user; receiving lottery ticket order information including player selections associated with the lottery ticket; generating a unique code associated with the order information and user information; upon receipt of the unique code, associating the ordered lottery ticket with the user; and subsequently reporting the status of the lottery ticket to the user. Generating the unique code may include generating a machine-readable code image corresponding to the code.

These systems and methods may be implemented in a variety of ways, some of which are illustrated herein.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
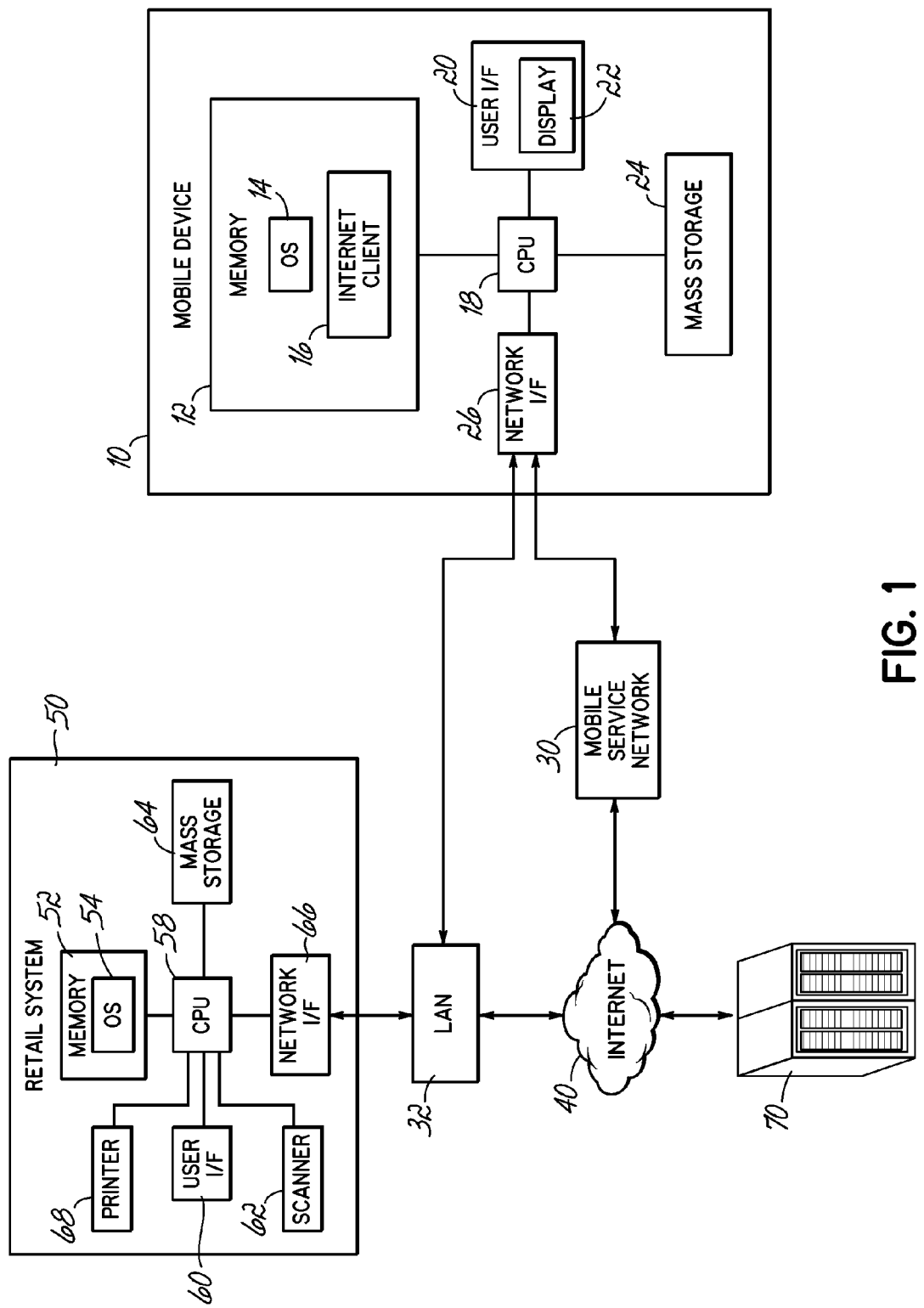
FIG. 1 is a diagram representing a mobile device, retail system, and lottery server connected to the internet in accordance with an embodiment of this invention.

This invention concerns the user on the use of mobile smart phones (MSP), personal electronic devices, and personal digital assistants (PDA), collectively referred to herein as mobile devices. There are several methods of distribution for a lottery application, or "app", on such devices. For the iPhone® and other such mobile devices, the application according to this invention may be available for download from the Apple® App Store. Each service provider for mobile data networking may have a similar application store or site that connects directly through the mobile device, and methods may exist to download and install applications on mobile devices by other means. Depending on the desires of the lottery authority, this application could be distributed in that method or a dedicated download site could be provided.

Once installed on the mobile device, the player can run the application. The application would immediately determine if the mobile device has the proper hardware installed. It will open a data connection. If any of these elements is missing, an error code will generate alerting the user that it is unable to function, as known in the art.

The player uses an application on his or her mobile device to fill up a wager. As further described below, the application may be server-based, where the player hits the web server of the lottery though the mobile device's internet browser, or application based, running locally on the mobile device after the user has downloaded and installed it from the lottery's web site or elsewhere.

In either case, the application may allow the player to select the type of the game he or she wishes to participate in and then pick his or her numbers or other relevant selections. In some embodiments, the player can also store the selections for later use and/or reuse. After finishing with the selections, the mobile device converts the selections into a machine-readable code image which is displayed on the mobile device's screen representative of the player's selections.

The player can buy a lottery ticket with his or her selected numbers by simply presenting the mobile device display with the machine-readable code image displayed to the retailer's optical reader device. The optical reader device can either be a typical barcode reader or a camera enabled reader; in some instances, the optical reader may be made available for the player to scan the code instead of the retailer. A lottery terminal using the appropriate software recognizes the scanned code and recognizes the string represented by the code. After decoding, the selling procedure continues following the normal procedures that the selected lottery authority has dictated for the sale of an on-line lottery game, such as performing a transmission with the host system and printing of the relevant ticket. In addition, or alternatively, a lottery image ticket may be transmitted to the player's email address, phone number, or lottery account.

The direct on-screen reading method of selling on-line games according to this invention provides several advantages. It speeds up the selling process for a lottery ticket as no filling out, reading and decoding of play slips is required. Typically, for a play slip to be read and decoded using conventional approaches demands at least one second. However, the direct on-screen reading method significantly reduces the time in processing the lottery ticket to less than 0.1 seconds. The generation of a machine-readable code image that is representative of the player's selections significantly reduces the processing levels required in conventional methods. Conventional methods in which a paper slip is scanned and then decoded to determine the player's selections from the scanned image of the paper slip requires significant amounts of processing power. The scanned image of the paper slip results in significantly large memory files that have to be stored as well as decoded. Further, the decoding of the scanned image into a medium that can be processed by a conventional processor to determine the player's selections also requires significant amounts of processing power.

Rather, the input of the player's selections directly into the mobile device 10 eliminates the need to scan a paper slip into a digital image that requires significantly large memory files that have to be stored and decoded. Further, the generation of a machine-readable code image that is easily decoded by the cpu 18 of the mobile device 10, the cpu 58 of the retail system, and/or the server 70 requires significantly less levels of processing power than what is required to decode the scanned image of the paper slip. Thus, the direct on-screen reading method not only significantly reduces the amount of time necessary to process the lottery ticket but significantly reduces the processing power required to decode the lottery ticket as well.

Additionally, no paper play slips are needed, and so the associated costs of printing and distributing them are eliminated. Also, the player picks his or her selections in a more interactive way than with the static method of filling in a paper play slip.

Turning now to the drawings, FIG. 1 illustrates one embodiment of a mobile device 10. The mobile device 10, which may be any sort of web-enabled device such as a smart phone or PDA, may include memory 12 that further includes an operating system 14 and an internet client 16. Other clients, including SMS or phone clients, may also be available. The mobile device 10 further includes a processor 18, a user interface 20 including a display 22, mass storage 24, and a network interface 26. In one embodiment, the display 22 may be a graphical display capable of representing images, most specifically a barcode, QR (quick response) code, or other machine-readable image. In one embodiment, the network interface 26 may gain internet access by means of a mobile service network 30 associated with a network service provider, and alternatively may have the ability to find and communicate with a local area network 32 in order to access the internet 40.

Also illustrated in FIG. 1 is a retail system 50 which may enable the sale of a variety of retail products, including lottery tickets. Here, the retail system may be a computer system including memory 52 that further includes an operating system 54. The retail system 50 may further include a processor 58, a user interface 60, mass storage 64, and a network interface 66. The network interface 26 may provide access to the internet 40 by means of a local area network 32, by the use of a modem, or by any other method of accessing the internet as known in the art. The retail system 50 may further include an optical scanner 62, which is capable of reading the machine readable code displayed by the display 22 as further described below, and a lottery ticket printer 68. It will be understood that any device or method by which lottery tickets can be produced and sold, honoring the selections of a customer and the regulations of the lottery authority, may take the place of the printer 68 in accordance with this invention.

Although both the mobile device 10 and the retail system 50 are shown connecting to the internet 40 by means of the same diagrammatic object representing a local area network 32, the local area network by which the mobile device 10 connects to the internet may instead be a different network from the network used by the retail system 50. In some embodiments, the mobile device's use of the internet as herein described may occur at a significantly earlier point in time than the retail system's use of the internet, and may occur in a different physical location within the scope of this invention.

Also illustrated in FIG. 1 is a lottery server 70, which may include data associated with a lottery game. The lottery server 70 may represent the means by which lottery image tickets sales are reported and registered with the authority running the lottery. The server 70 may also be the source of the application or website used in accordance with this invention. However, the web server by which the mobile device accesses the mobile website or downloads the mobile application may be a different web server than the lottery server 70 with which the retail system 50 communicates to authorize and report the sale of lottery image tickets.

Although the devices 10, 50 are shown connecting to the server 70 by means of the internet 50, it will be understood that any telecommunications system and protocol allowing for the connection of one or more of these systems to the server 70 may be used, including a private or local communications network that is not properly the internet. For example, in some embodiments, a private, non-internet connection may exist between the mobile service network 30 and the server 70. As another example, the retail system 50 may be connected locally or through a secure private connection to the server 70. One of ordinary skill will recognize that services that can connect over the internet can also connect in more localized ways without departing from the scope of this invention, and that specific embodiments wherein the internet is bypassed may still embody the methods and inventions described herein.

Figure 2:
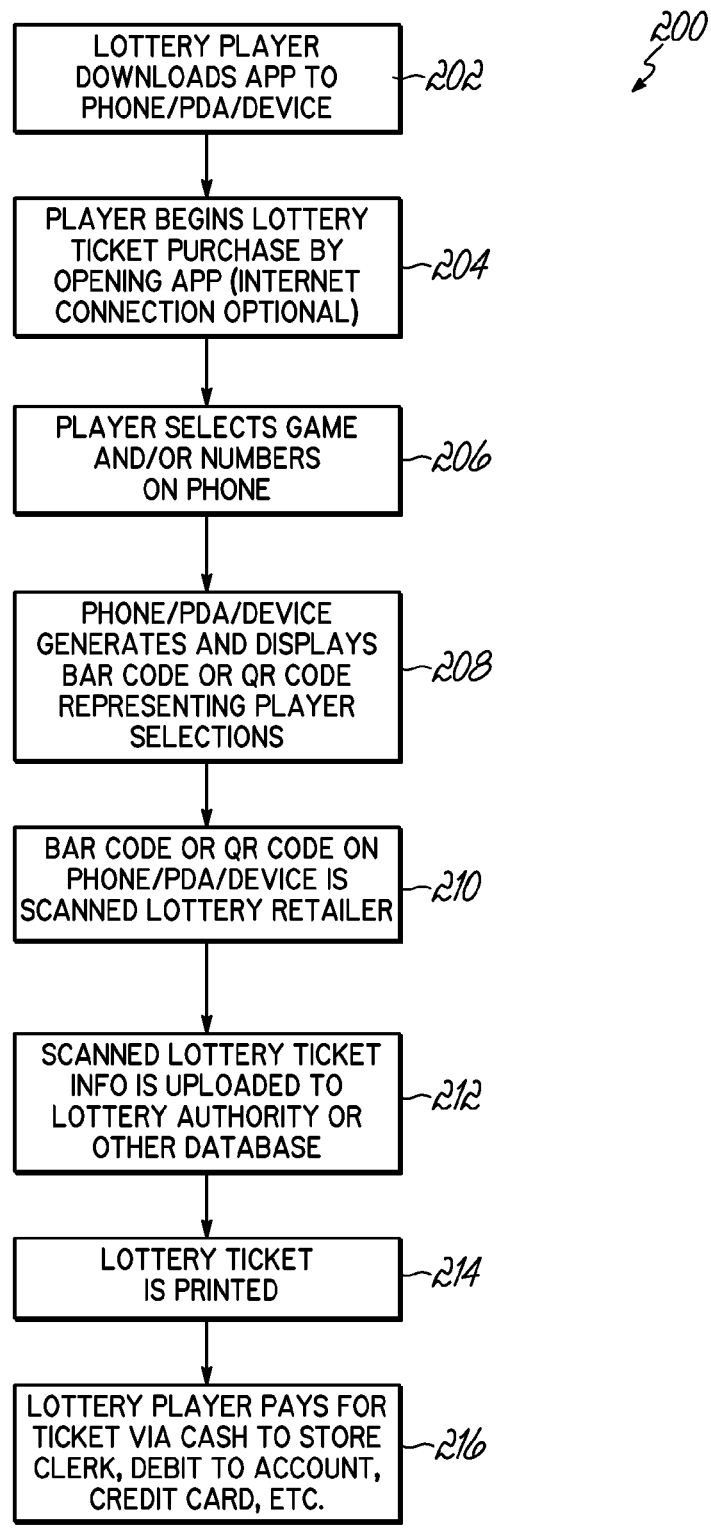
FIG. 2 is a flowchart representing a process for using a mobile application for purchasing a lottery ticket in accordance with an embodiment of this invention.

An illustration of a method by which a user may play the lottery in accordance with this invention is shown by the flowchart 200 of FIG. 2. Here, a lottery player downloads an application to a mobile device (block 202). The application may be available through an application vending process available through the mobile device's service provider (e.g., an "app store") or otherwise available for download and installation through a website associated with the lottery authority or through a third party website.

Once the application is available on the user's mobile device, the user may later begin the order of a lottery ticket by first opening the relevant application (block 204). At this point in the process, the application may access the internet and a lottery server (such as the server 70 shown in FIG. 1 above); alternatively, the application may run on the device without connecting to the internet.

Figure 3A:
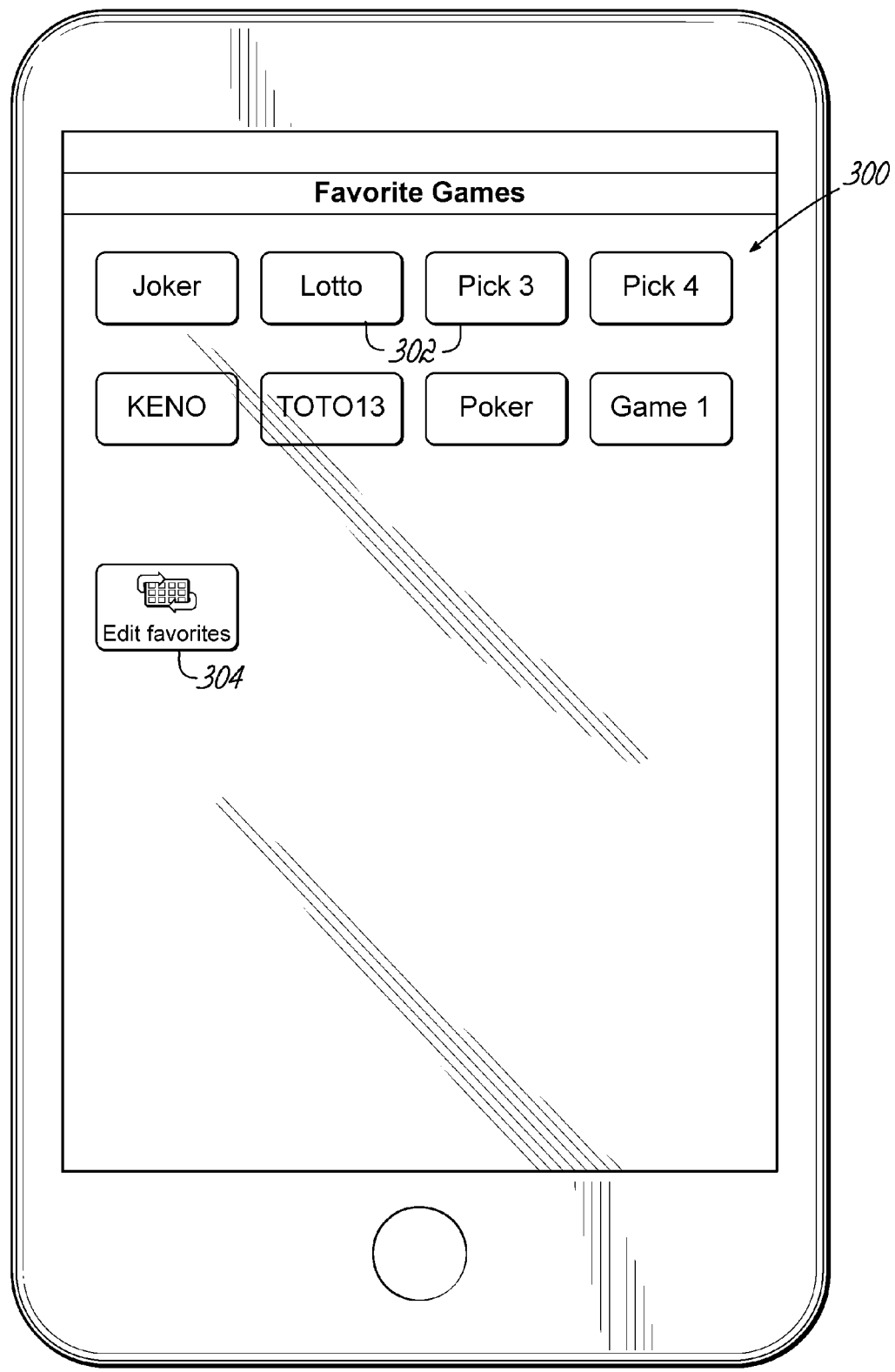
FIGS. 3A-3F show pages associated with the mobile application of FIG. 2.

Although an introductory or login page may first be displayed (see login page 500 of FIG. 5A below), in one embodiment the application may begin by displaying a favorite games page 300 as shown in FIG. 3A. The games page 300 may include a variety of lottery icons 302, each of which is selected by any means appropriate for the user interface, such as by cursor selection or by touch. Each lottery icon 302 represents a specific lottery game.

Figure 3B:
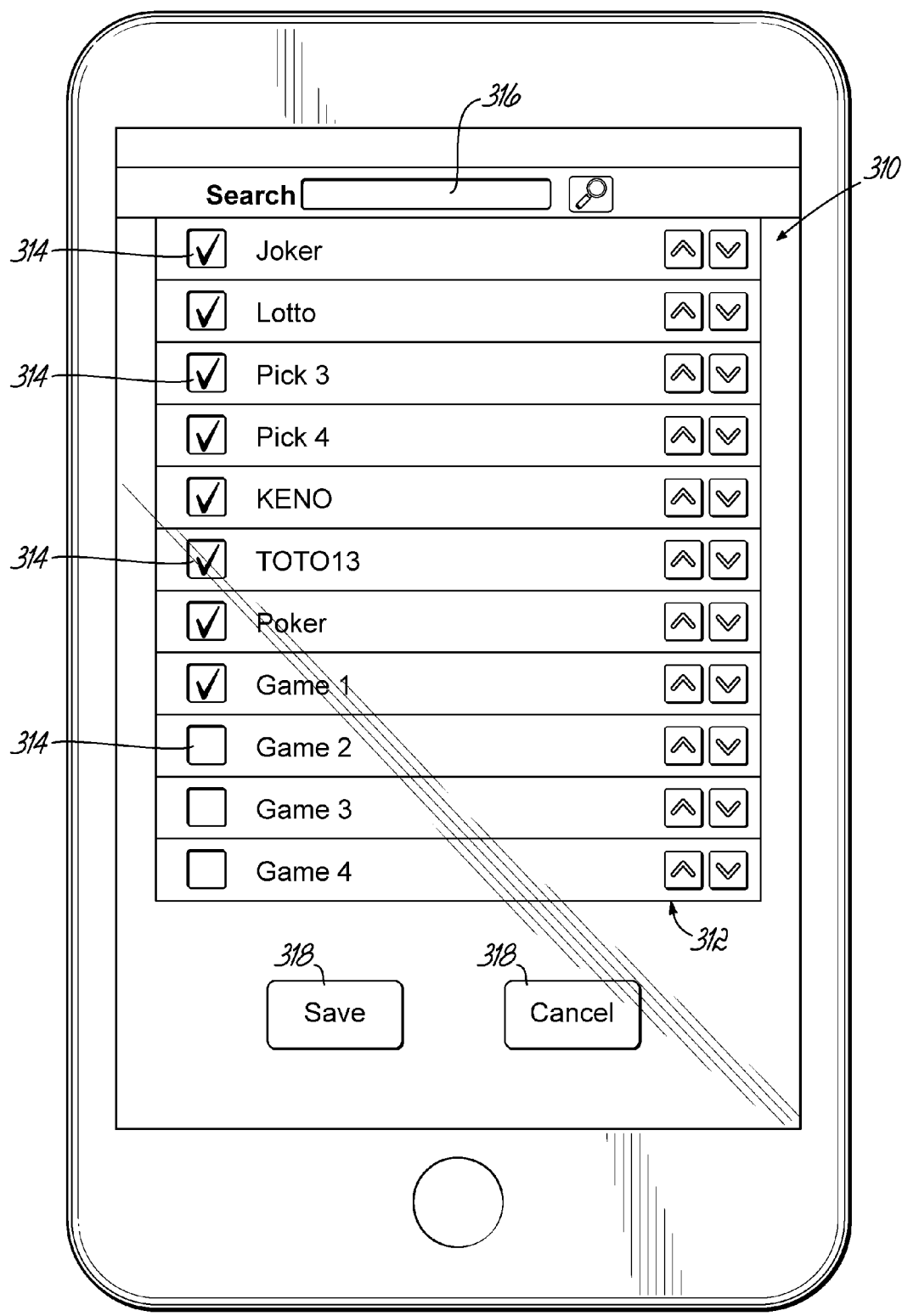

The application may initially include a pre-selected set of popular games on the favorites page 300, which can thereafter be customized by the user. In one embodiment, an additional icon 304 below the lottery icons 302 leads the user to an edit page 310 as shown in FIG. 3B. The edit page 310 may include a list 312 of all available games. The list 312 may include checkboxes 314 or other elements of a user interface known in the art that allow the user to designate which games from the list 312 should be displayed on the favorites page 300 and in what order. The edit page 310 may also include a search box 316 allowing the user to search for his favorite games. Navigation icons 318 allow the user to save or discard his or her changes and return to the favorites page 300.

Figure 3C:
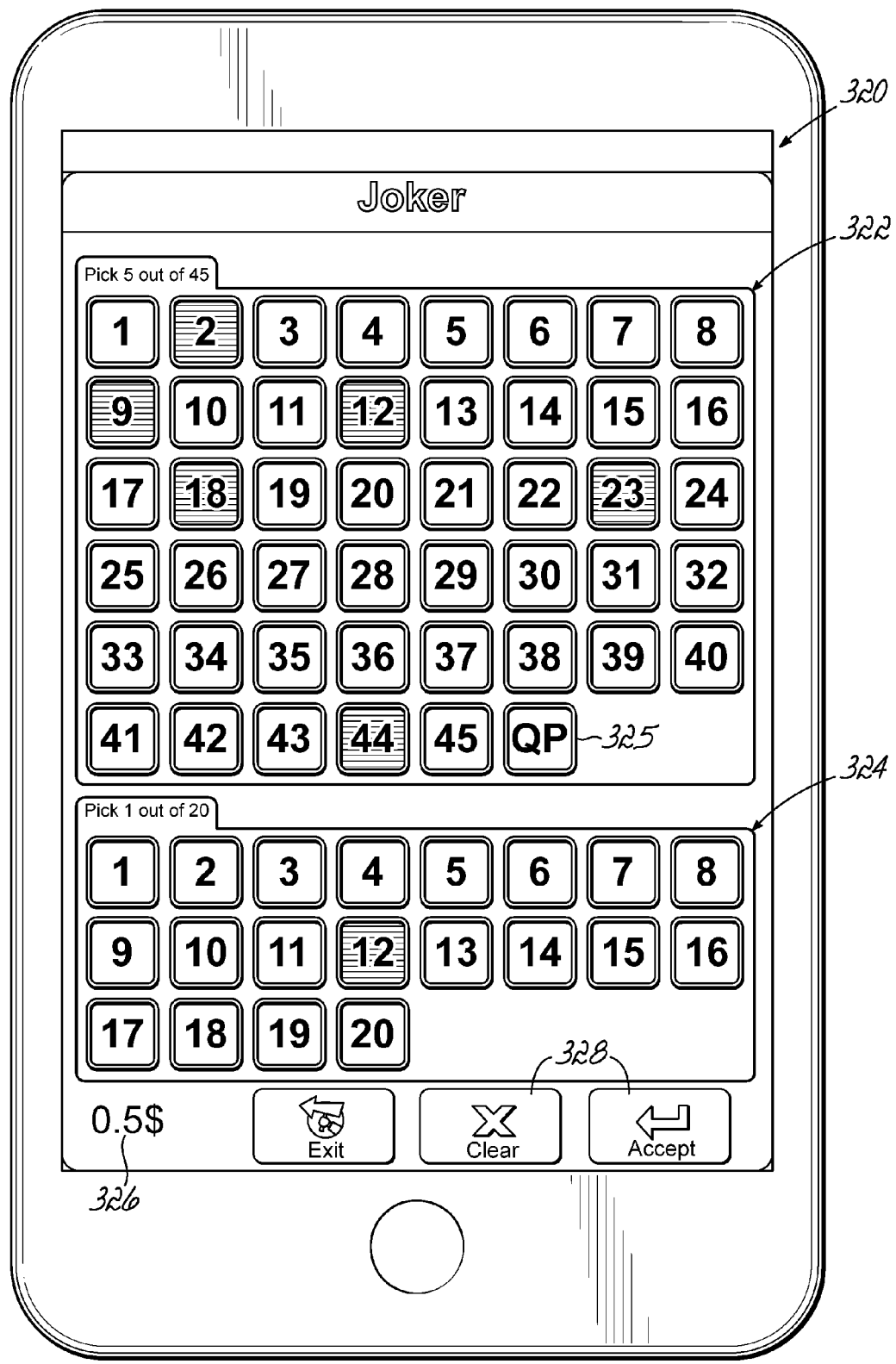

From the favorites page 300, it is also possible to select from the icons 302 in order to enter a page specific to that game. For example, as illustrated in FIGS. 3A and 3C, selection of the "Joker" icon 302 may take the user to the Joker page 320. This page may convey considerable information associated with the Joker lottery game. For example, the necessary selections for the Joker game are displayed in the page windows 322, 324. In this embodiment, five distinct numbers between 1 and 45 must be picked in the first window 322, and a sixth distinct number between 1 and 20 separately selected in the second window 324. Each selection can be made by use of the appropriate numbered icons within each window 322, 324. Alternatively, the use of a "quick pick" button 325 may automatically and randomly make the necessary selections, which could then be further modified by the user. Additional information, for example a price display 326 that may reflect the cost of a ticket for the selected lottery, may be shown. It will be readily understood that the Joker lottery game is discussed and shown herein merely as an example of one of many types of games compatible with this invention.

If the user is accessing a lottery page for the first time, the application may open to a page with default or random options selected. However, the application may record the user's selections. Each time the user selects a lottery page that the user has previously visited, the page may display the same selections that the user most recently made on that lottery page.

At the bottom of the page 320, navigation icons 328 may allow the user to return to the previous menu page ("Exit" icon 328), to reset the choices ("Clear" icon 328), or to enter the choices for processing by the app ("Accept" icon 328). The selection of the "Accept" icon 328 by the user triggers the generation of the machine-readable image 332. The machine-readable image 332 is a representation of the player's selections that may be easily decoded and processed by the CPU 18 of the mobile device 10, the cpu 58 of the retail system, and/or the server 70. For example, the player enters their selections for processing. A QR code is then randomly generated that represents the player's selections. Rather than executing the cumbersome process of decoding a scanned image of the paper slip to determine the player's selections, the CPU 18 of the mobile device 10, the cpu 58 of the retail system, and/or the server 70 may easily decode the generated QR code to determine the player's selections. The decoding of the QR code requires significantly less processing power while processing the player's selections in a significantly shorter time span than the conventional processes of decoding a scanned image of the paper slip.

Figure 3D:

Returning to the process illustrated by the flowchart 200 of FIG. 2, if the user chooses to submit the choices for processing (block 206), the mobile device generates a display representing the player's selections (block 208), as illustrated by the page 330 of FIG. 3D. The display page 330 depicts the generated machine-readable image 332 that represents the player's selections so that the player's selections may be easily decoded in an efficient manner. The machine-readable image 332 is suited to be read by an optical scanner, and so may include a machine-readable image 332 such as a bar code or QR code, or any suitable data-encoded image as known in the art. Main text 334 may be displayed as well, representing a code that can be entered into a retail machine if reading the machine-readable image 332 fails as the result of the malfunctioning, misuse, or absence of an optical scanner.

In one embodiment, the machine-readable image may represent a code that is a string of alphanumeric characters that are generated by an algorithm contained within the mobile device application and relate directly to the selections made by the operator. In the example shown in FIG. 3D, as shown by the plain text 334, the string is as simple as the game name followed by the selections made. Other encoding schemes known to both the retail system and the mobile application are possible.

Figure 3E:
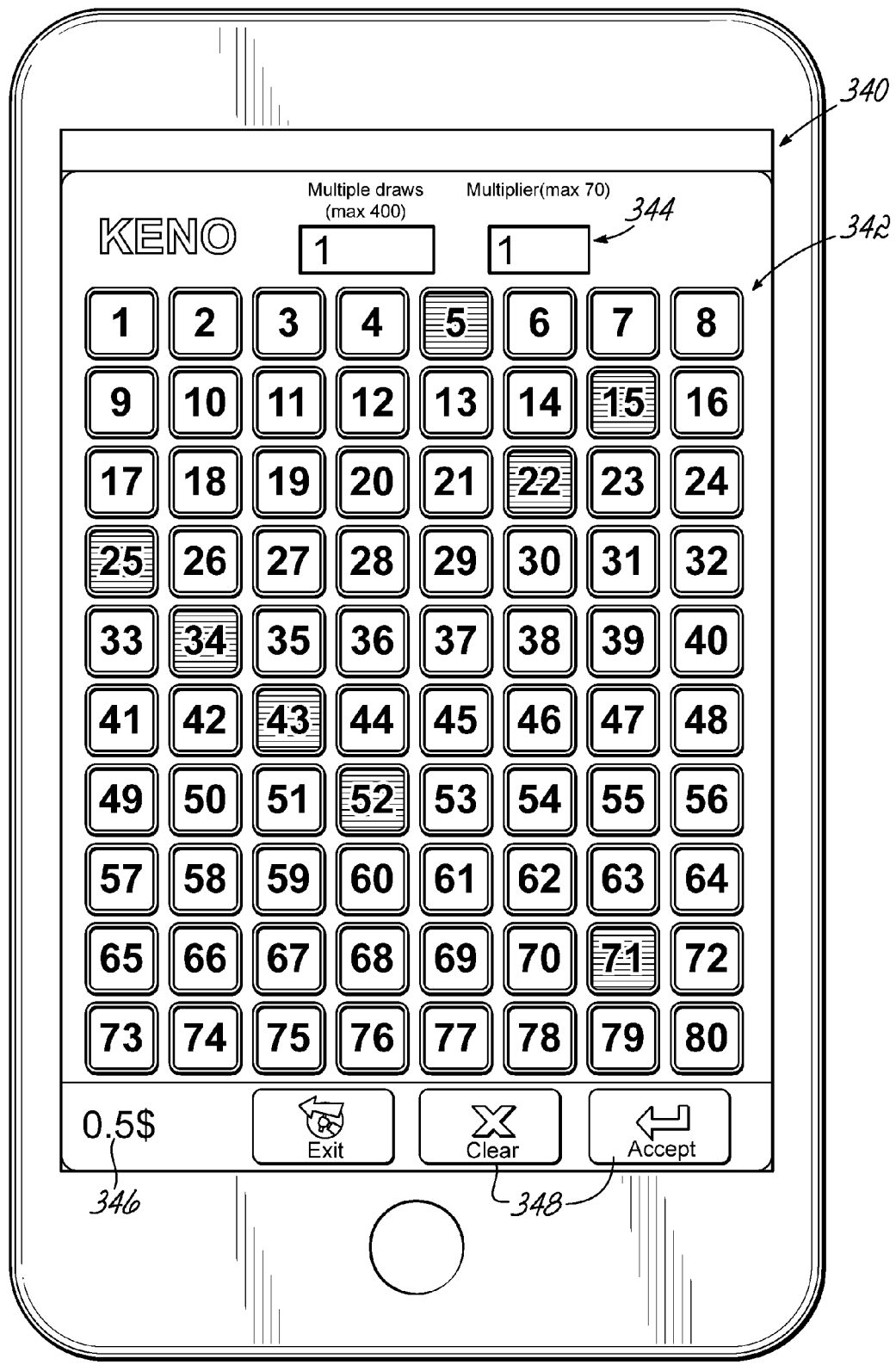
Figure 3F:
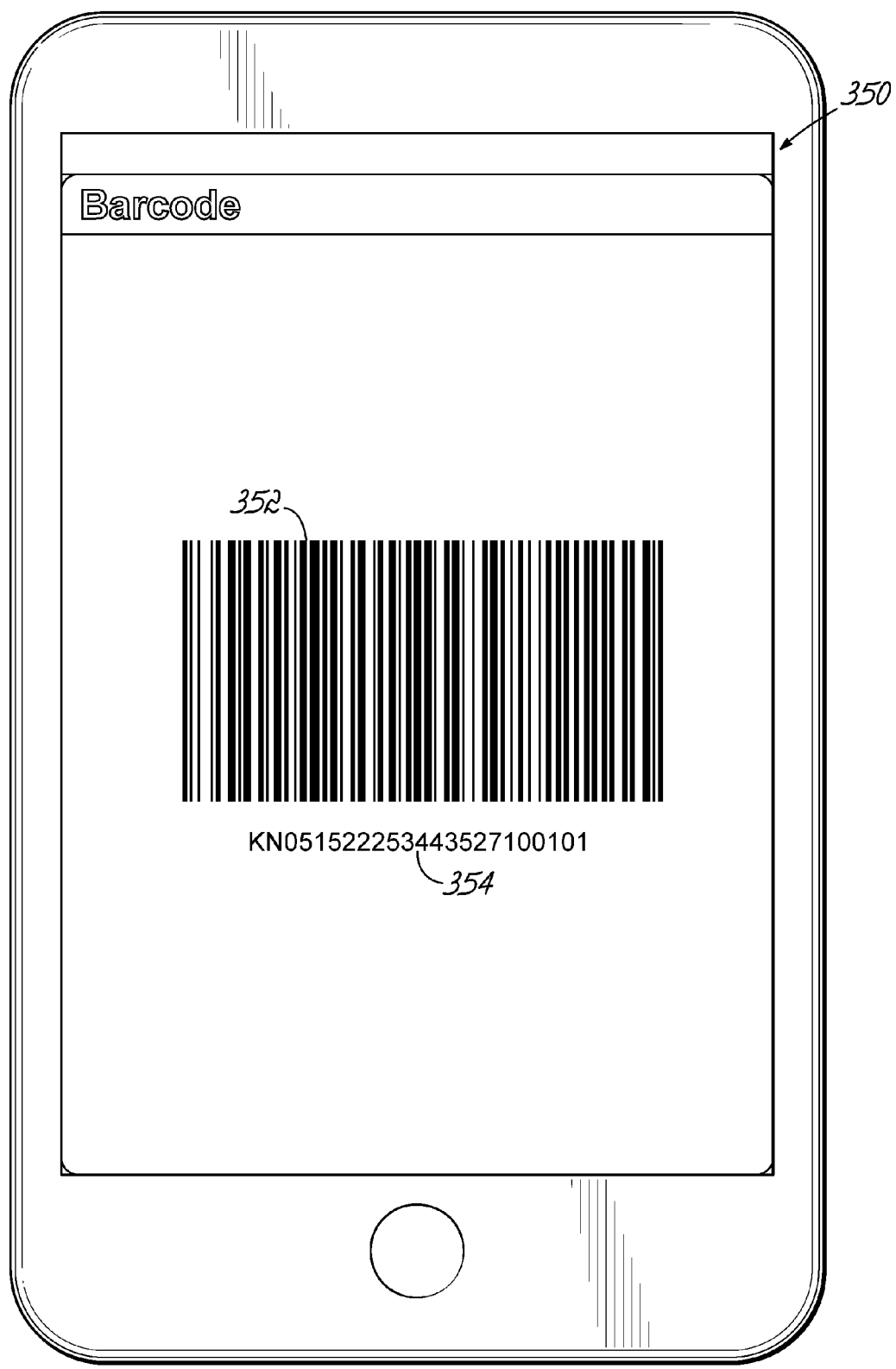

FIGS. 3E and 3F show another example of a lottery page 340 and resulting code display page 350, this time for a "KENO" lottery game in which eight numbers are selected from 1 to 80. A window 342 is used to select the numbers, and as above, subsequently accessing the same page 340 may result in the previous selections being made as the default. Text entry boxes 344 allow a user to select a number of draws and a multiplier, each of which may increase the price of the ticket order as displayed at 346 below. As before, navigation icons 348 allow the user to accept the selected values or return to a previous menu page.

The display page 350 shows another embodiment of a machine readable image 352, which is a barcode image of any appropriate standard or non-standard encoding scheme. Again, a text representation 354 may accompany the barcode image 352.

After the machine-readable image 332 or 352 is scanned (block 210), a lottery ticket order can be submitted by the retail system 50 to the lottery server 70, which authorizes the retail system 50 to print one or more lottery tickets according to established rules and procedures (block 212). The ordered tickets are printed (block 214) and paid for (block 216) in accordance with known procedures for lottery retail. Alternatively an email or SMS with the lottery image ticket is sent to the player according to his/her preferred notification selection.

Figure 4:
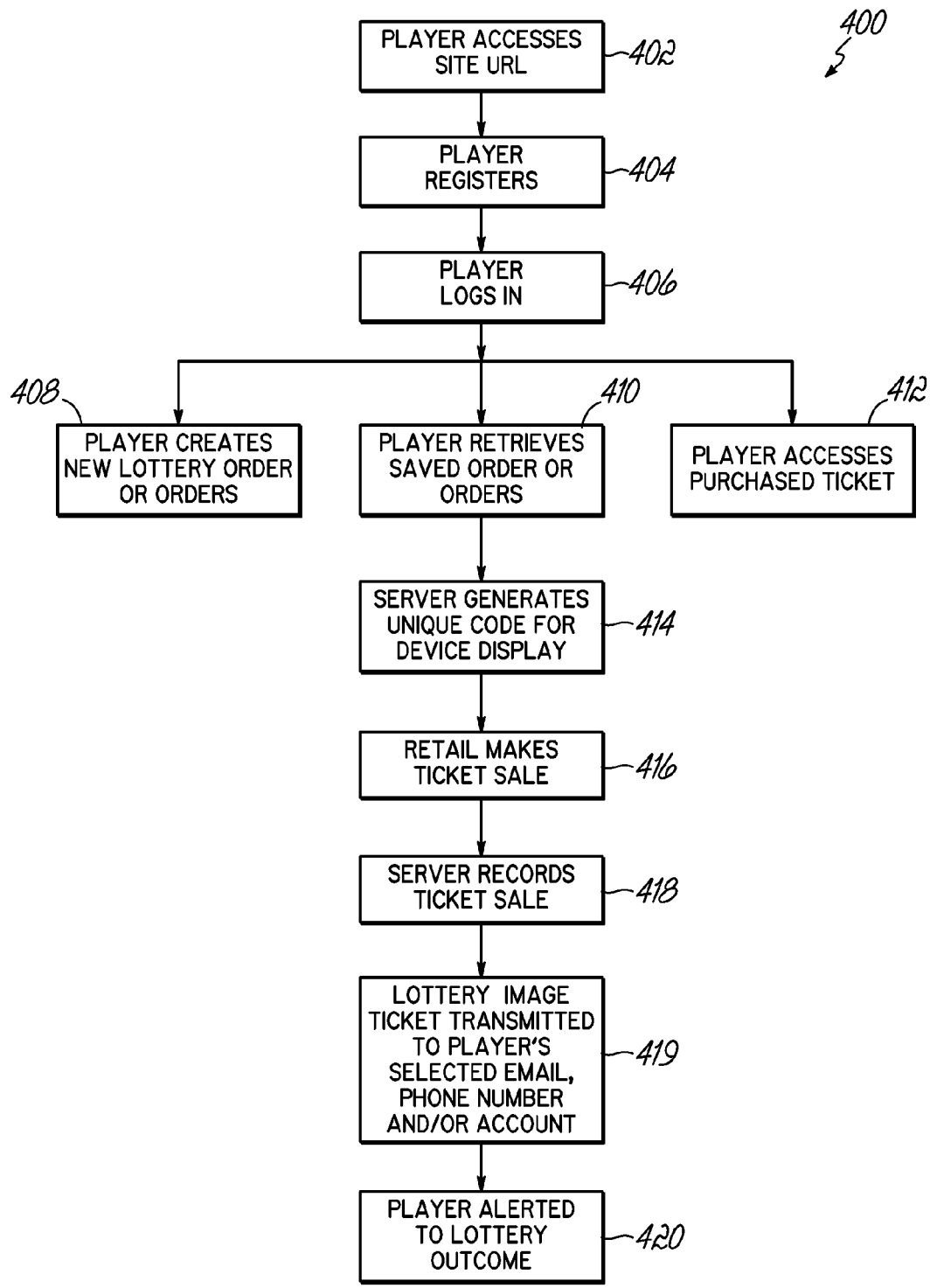
FIG. 4 is a flowchart representing a process for using a mobile website for managing lottery ticket purchase orders in accordance with an embodiment of this invention.

As an alternative to an executed application, the same functions described above, as well as additional functions convenient for a lottery, may be accessed by means of a mobile website. One embodiment of a method by which a mobile website may be used is illustrated by the flowchart 400 of FIG. 4.

To use a mobile website, a user may access the mobile website by entering the site's URL in an internet client such as a web browser associated with their mobile device (block 402). The website may be associated directly with the lottery authority or with a third-party system.

To initialize the use of the mobile website, the player first registers at the site (block 404). In registering, the player may give the server sufficient information to uniquely associate the player's subsequent behavior with the player and to enable some of the additional features discussed below.

Figure 5A:
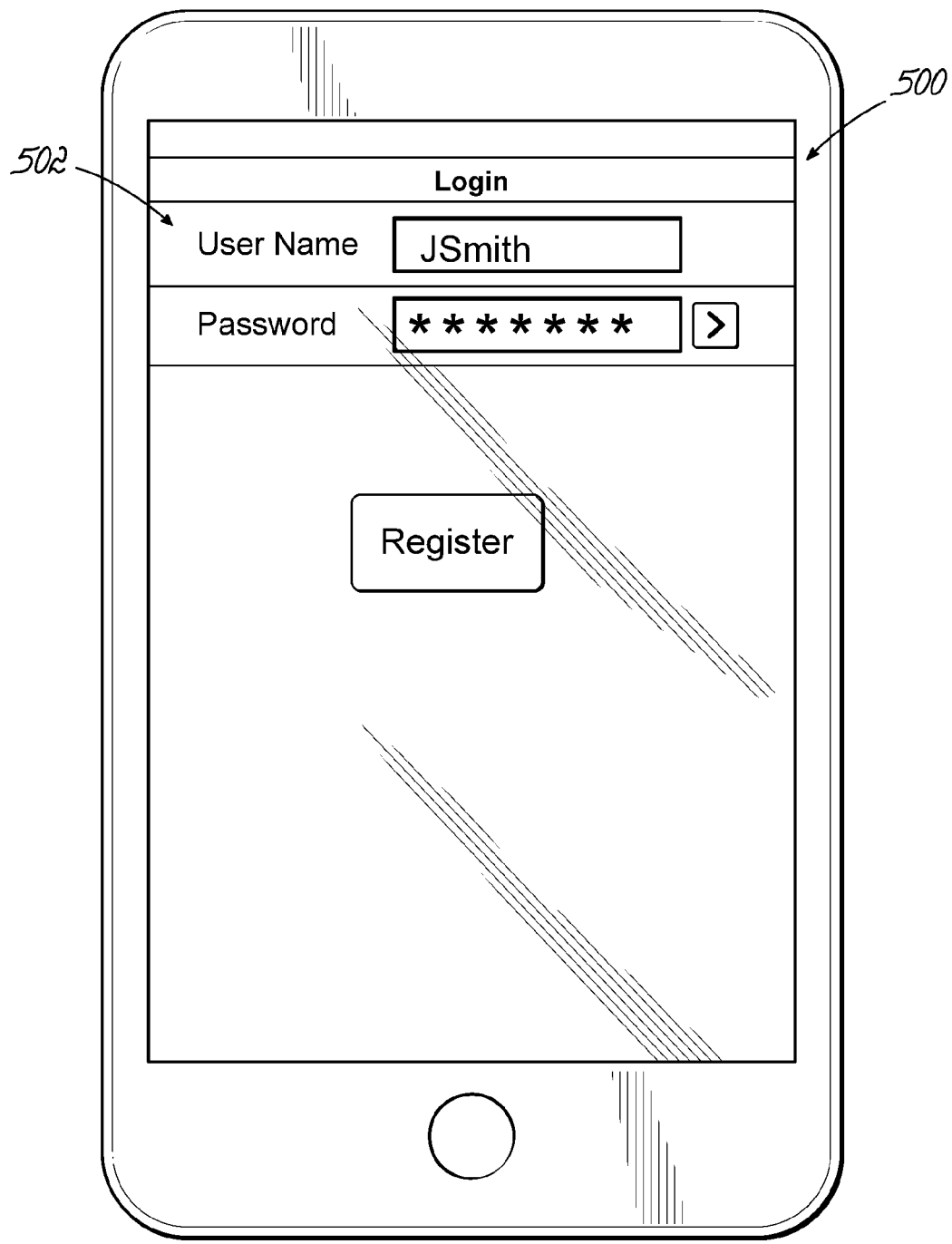
FIGS. 5A-5E show pages associated with the mobile website of FIG. 4.

Once the player has registered upon a first visit, or on subsequent visits, the player then logs into the site (block 406), which associates the player's subsequent behavior with a known account. As shown in FIG. 5A, a user may enter information into a login prompt 502 located on a login page 500. Subsequently, shown as element 504 in FIGS. 5B-5E, the user's account name may be displayed on each page, and pages may show content associated with the logged account.

Figure 5B:
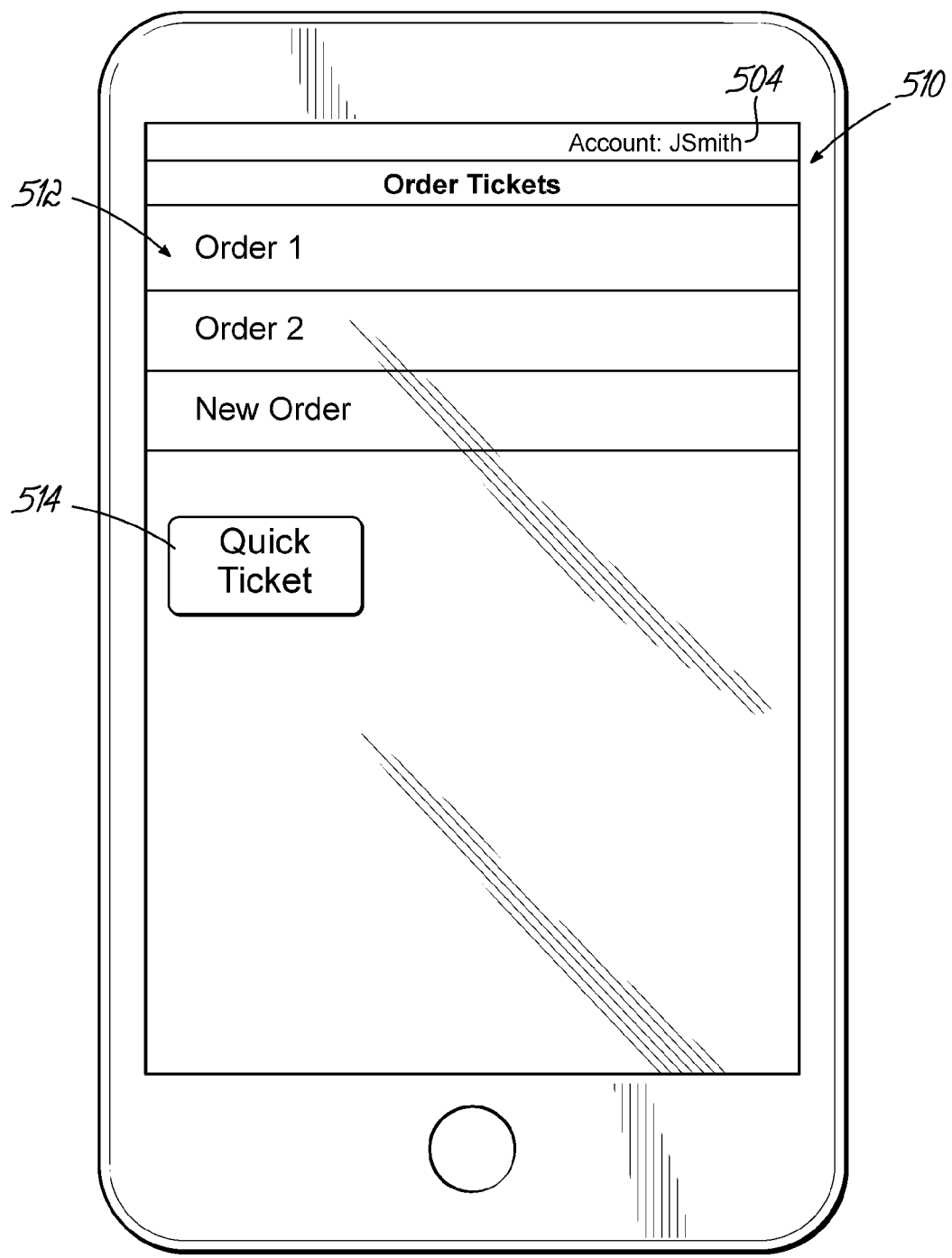
Figure 5C:
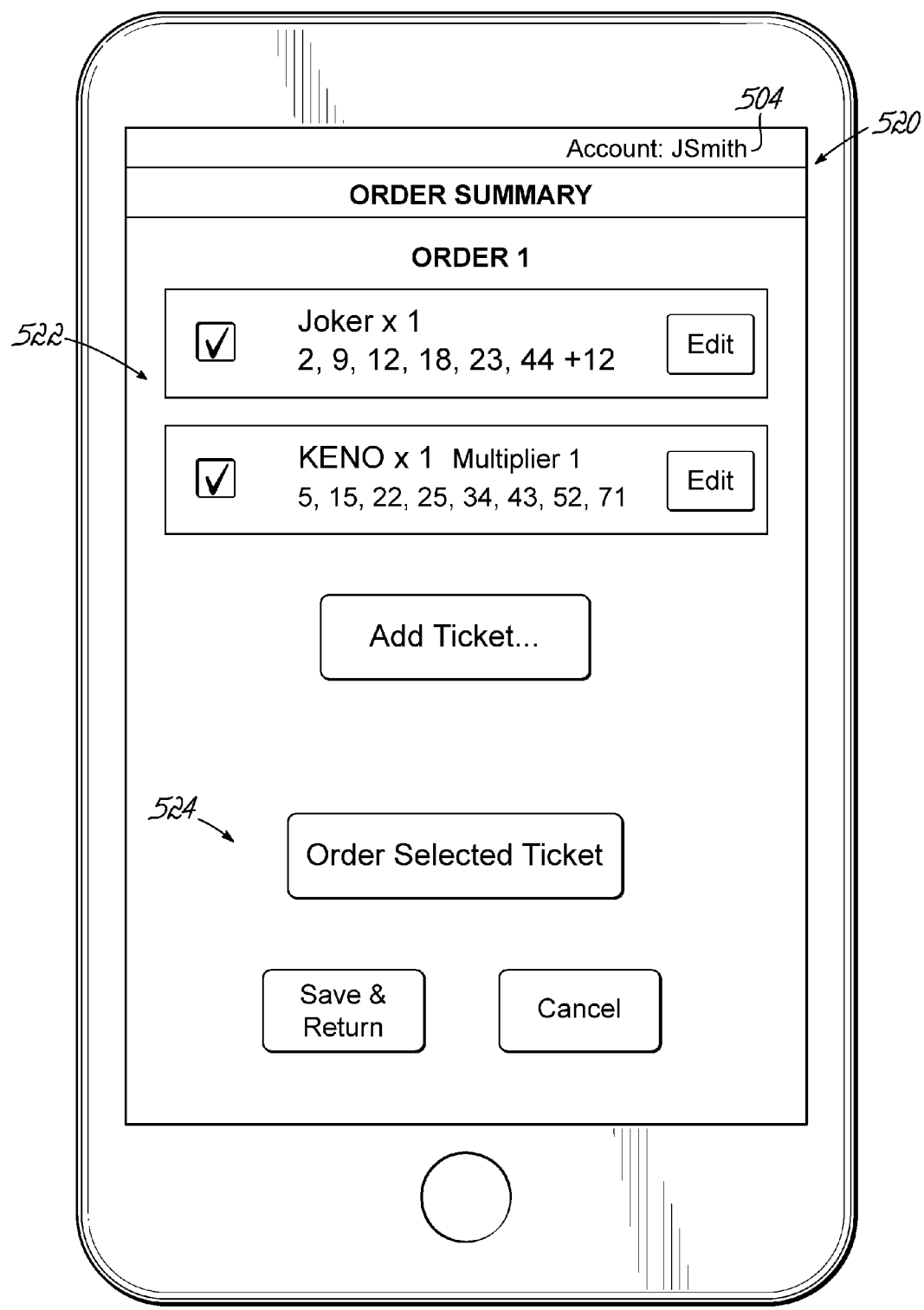
Figure 5D:
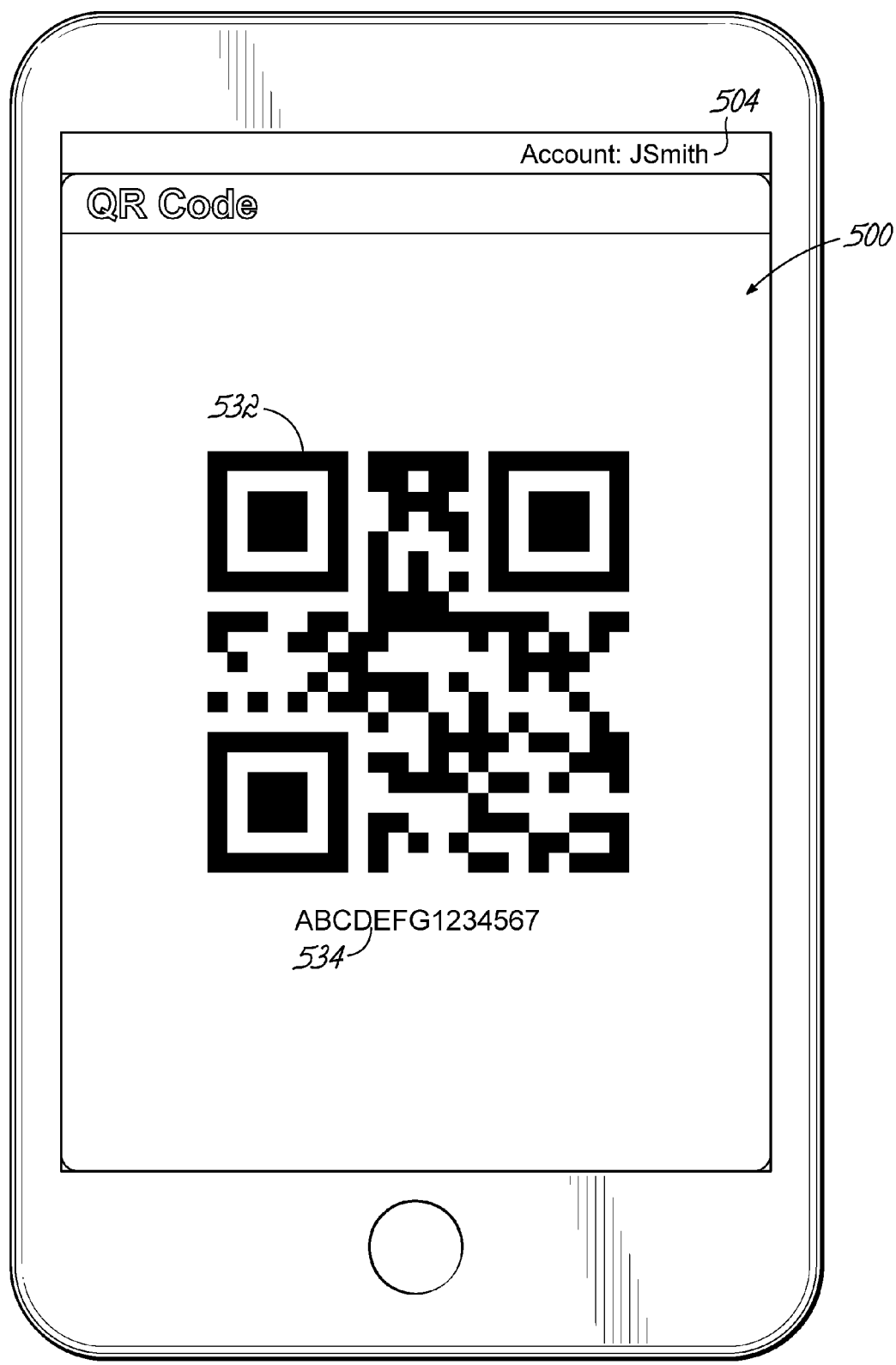

Having logged in, the site user may now have a variety of options associated with the features of the website. For example, the user may be able to create a new order for one or more lottery tickets (block 408), retrieve a saved order for one or more tickets (block 410), or access data associated with purchased tickets (block 412). Creating new or accessing saved orders may involve an order management page 510 as shown in FIG. 5B. The page 510 may include a list 512 of all saved orders, as well as an option to begin a new ticket order.

Accessing an item in the list 512 presents to the user an order summary page 520 that shows, in summary, the order information associated with a list 522 of selected tickets, as illustrated in FIG. 5B. The list 522 may include only one lottery ticket, or may include more than one. The user may have the ability of editing an entry in the list 522, in which case a page similar to the page 320 shown in FIG. 3C may be provided allowing the user to change the selections made for that ticket. Multiple tickets with different selections for the same lottery can be placed in the same ticket order by listing the lottery multiple times.

Changes made to the order may be saved or discarded by use of the "Save and return" or "Cancel" icons 524, which allows the user to return to the order management page 510. To select and process the order, the "Order Selected Tickets" icon 524 is selected.

It will be understood that, as with the application illustrated with screenshot in FIG. 3A-3F above and block 208 from flowchart 200 of FIG. 2, the resulting machine-readable image code may represent the ticket order directly, and may be decodable by means of a retail machine without access to a lottery server. However, in accordance with another embodiment of the invention and as described in block 414 of the flowchart 400 of FIG. 4, entering a new or saved ticket order (blocks 408 and 410) may result in the generation of a unique code that is associated by the lottery server 70 with the specific order being placed. The mobile device may display a page 500 with a machine-readable image 532 and associated plain text 534 of this code, although neither the mobile device itself nor an offline retail system may have sufficient information to decode it.

In such an embodiment, the server 70 rather than the CPU 18 of the mobile device 10 may generate the machine-readable image 532. After the user has finalized the player's selections and has clicked on the "Accept" icon, the server 70 may generate the machine-readable image 532 that is then stored by the CPU 18 of the mobile device 10 and displayed by the mobile device 10. However, the machine-readable image 532 is unique to the server 70 so that only the server 70 itself may decode the machine-readable image 532 to determine the player's selections. The generation of the unique machine-readable image 532 increases security so that other devices such as the mobile device 10 itself or any retail system 50 may not access the player's selections. By limiting the capability of decoding the machine-readable image 532 to the server 70 alone lowers the risk that a hacker that is attempting to engage the mobile device 10 itself and/or any retail system 50 from collecting on any potential winnings entitled to the user by fraudulently representing that the hacker is the owner of the player's selections.

After the server 70 has decoded the machine-readable image 532 and provided it to the mobile device 10, the user may then engage any offline and/or online retail system. When a retail system accesses this unique code, rather than translating it into a lottery order and submitting an order to the lottery server, the code itself is instead submitted to the server 70, which returns the specifics of the ticket order as well as recording that the user associated with that unique code has placed the specified order with a retailer. The player purchases the tickets from the retailer as normal (block 416), and the lottery server 70 associates the tickets with the user account (block 418).

It will be recognized that a hybrid code including both the raw data associated with the ticket order and a unique user ID or order ID could also be used, which would allow the local retail system to process the ticket order and then communicate the user or order code to the lottery server. This version would allow the retail system to process tickets offline while uploading order information to the lottery server at intervals.

Figure 5E:
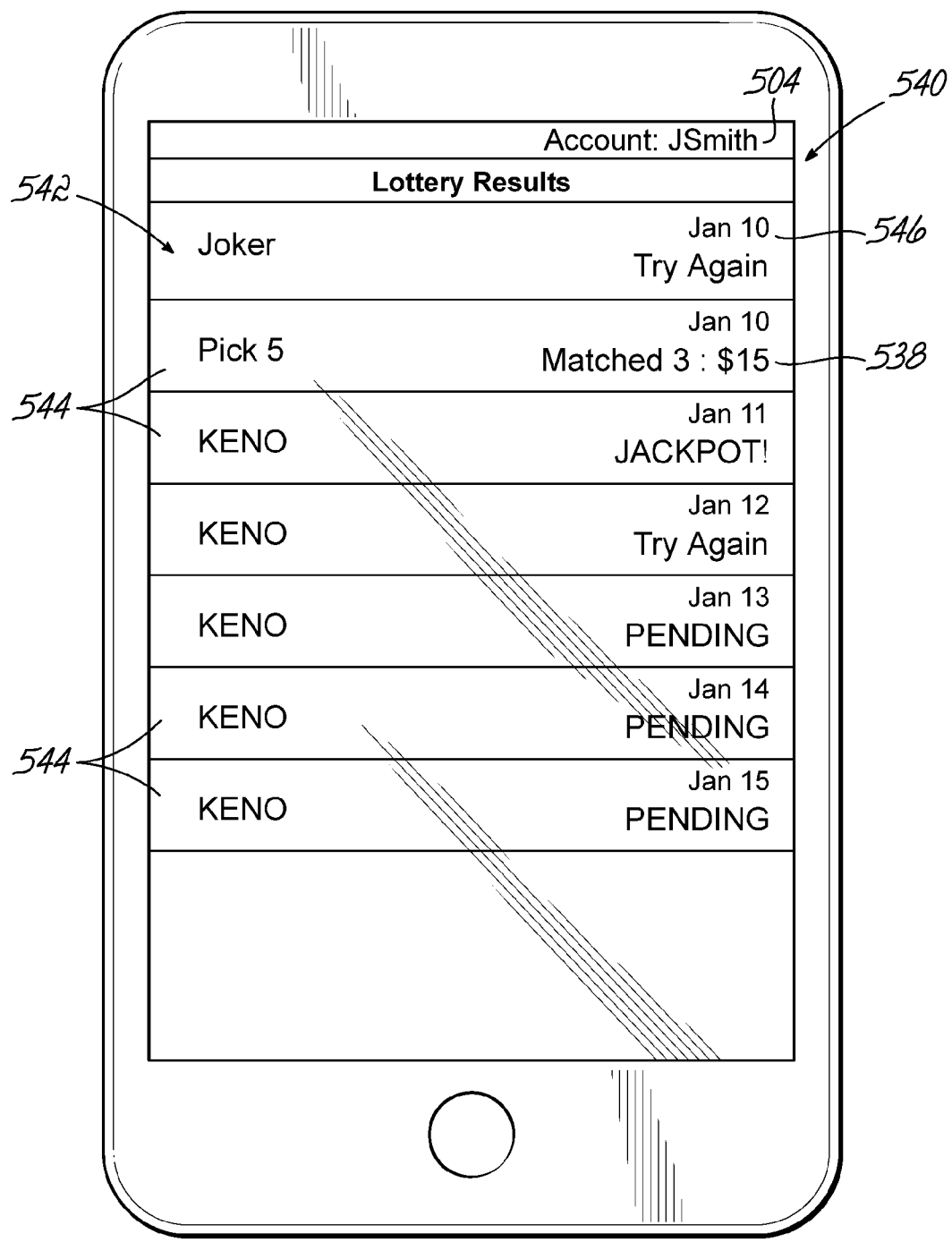
Figure 6:
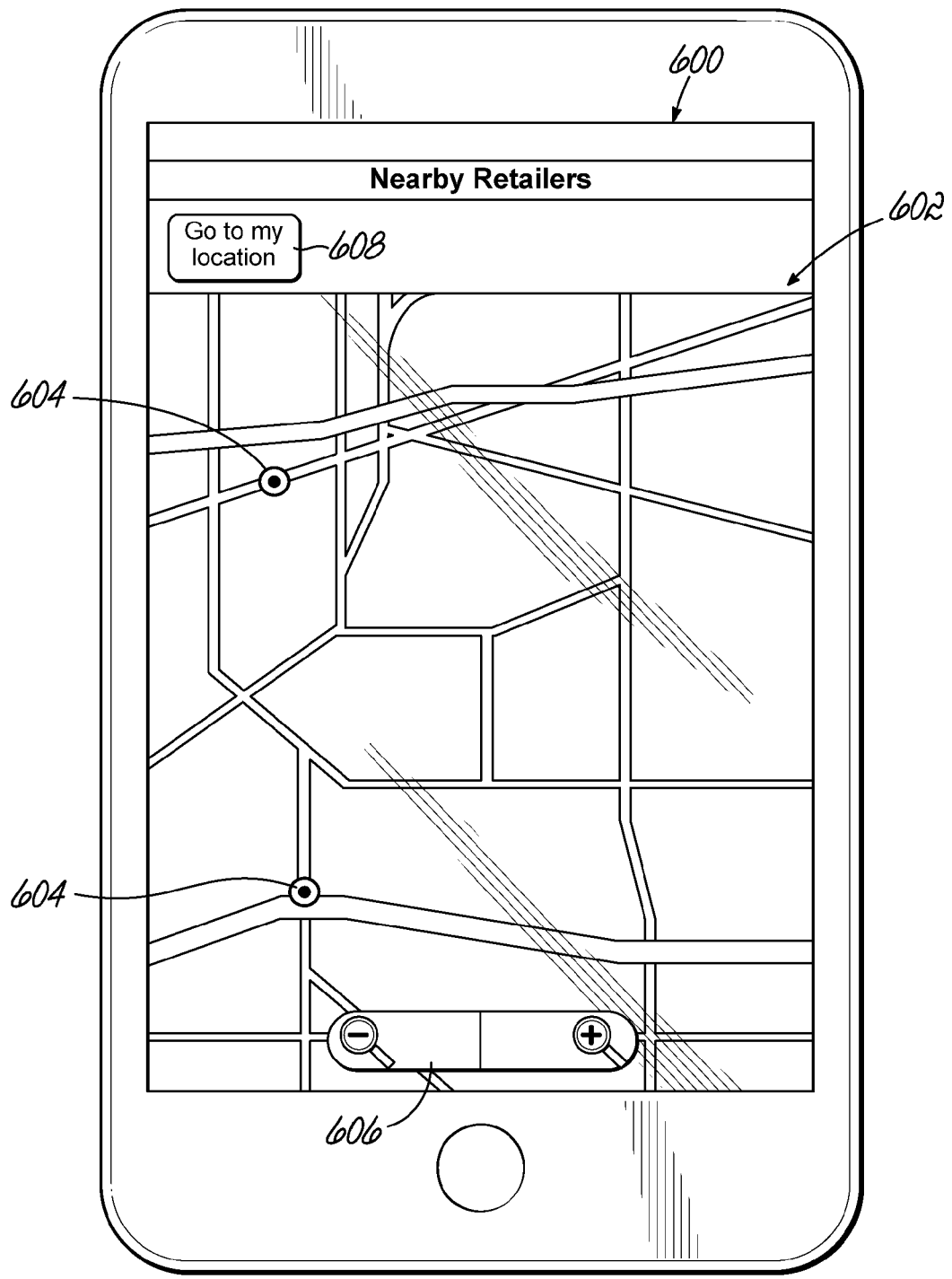
FIG. 6 shows a page associated with a mobile application or website for locating lottery retailers in accordance with an embodiment of this invention.

Having recorded the ticket sale on the server (block 418), it is now possible for the user to receive the lottery image ticket via their selected email, phone or other account (block 419) to access that information (block 412) via the mobile website or application. A lottery status page 540, as illustrated by FIG. 5E, may include a list 542 of purchased or saved tickets. Each entry 544 may include a date and/or time stamp 546, as well as an associated status display 538. Each status display 538 may include options appropriate to the game being played (such as "TRY AGAIN" for losing tickets, "JACKPOT" for full winners, information associated with partial matches or limited payouts, and the amounts of money won, if known), as well as a "PENDING" option used for lotteries that have not yet published results (which may be used as a default whenever information is not available for a given lottery). In some implementations of a status page such as the page 540, a user may be able to customize the status page to display a lottery result even if the user has no recorded ticket order associated with that lottery.

A mobile application or mobile website associated with this invention may include additional mobile device services. For example, a lottery retailer map page 600 may display a map 602 which marks locations 604 proximate to the user's current or selected location where lottery tickets can be purchased. Further navigation options 606, as well as an icon 608 to center the map on the mobile device's present position, may be included. Additional map features associated with mobile location-based map services are known in the art.

Figure 7:
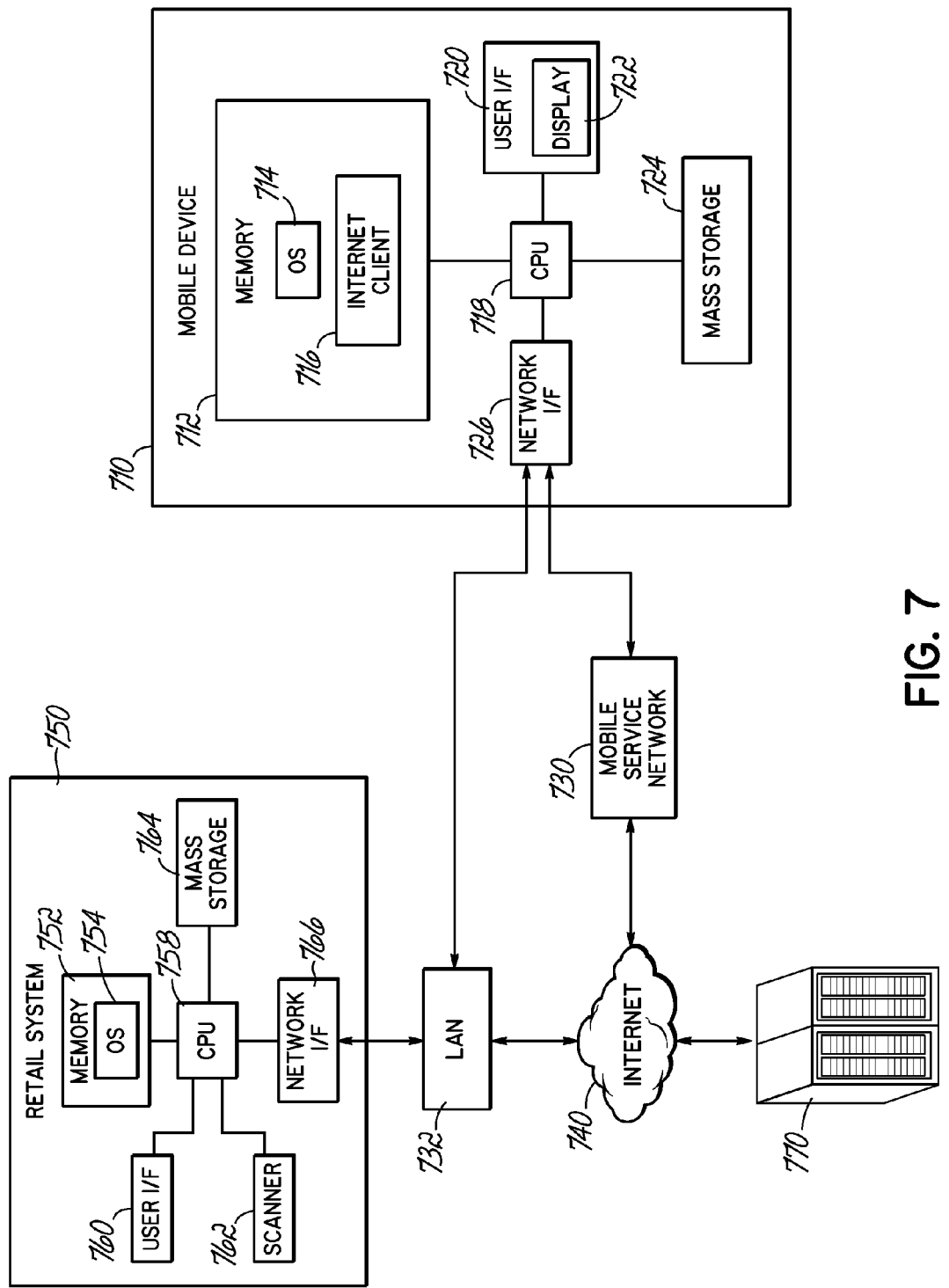
FIG. 7 is a diagram similar to FIG. 1, representing a mobile device, retail system, and lottery server connected to the internet in accordance with an alternative embodiment of this invention.

FIG. 7 illustrates one embodiment of a mobile device 710. The mobile device 710, which may be any sort of web-enabled device such as a smart phone or PDA, may include memory 712 that further includes an operating system 714 and an internet client 716. Other clients, including SMS or phone clients, may also be available. The mobile device 710 further includes a processor 718, a user interface 720 including a display 722, mass storage 724, and a network interface 726. In one embodiment, the display 722 may be a graphical display capable of representing images, most specifically a barcode, QR (quick response) code, or other machine-readable image. In one embodiment, the network interface 726 may gain internet access by means of a mobile service network 730 associated with a network service provider, and alternatively may have the ability to find and communicate with a local area network 732 in order to access the internet 740.

Also illustrated in FIG. 7 is a retail system 750 which may enable the sale of a variety of retail products, including lottery image tickets. Here, the retail system may be a computer system including memory 752 that further includes an operating system 754. The retail system 750 may further include a processor 758, a user interface 760, mass storage 764, and a network interface 766. The network interface 726 may provide access to the internet 740 by means of a local area network 732, by the use of a modem, or by any other method of accessing the internet as known in the art. The retail system 750 may further include an optical scanner 762, which is capable of reading the machine readable code displayed by the display 722 as further described below.

Although both the mobile device 710 and the retail system 750 are shown connecting to the internet 740 by means of the same diagrammatic object representing a local area network 732, the local area network by which the mobile device 710 connects to the internet may instead be a different network from the network used by the retail system 750. In some embodiments, the mobile device's use of the internet as herein described may occur at a significantly earlier point in time than the retail system's use of the internet, and may occur in a different physical location within the scope of this invention.

Figure 11:
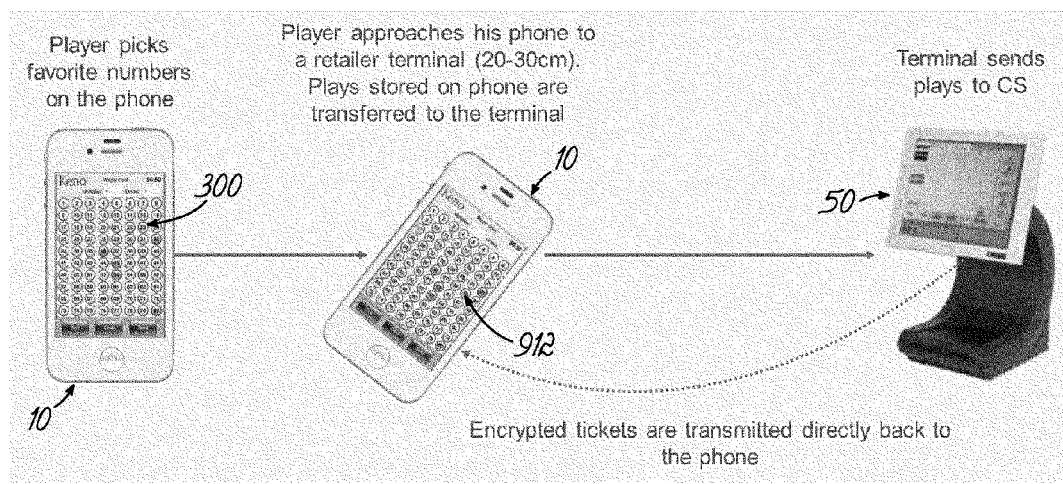
FIG. 11 is a diagram representing a mobile device and retail system in accordance with an embodiment of this invention.

For example, in one embodiment of this invention shown in FIG. 11, the mobile device 10 and lottery terminal 50 communicate directly and wirelessly with one another to facilitate the lottery transaction. Mobile device 10 and terminal 50 may use Bluetooth 4 proximity features or another wireless communication protocol to initiate an encrypted lottery transaction between them. Mobile device 10 may transmit to the terminal 50 the user's lottery selections plays and a session encryption key. Terminal 50 may then communicate with the lottery authority or a central system. The lottery authority may then create the ticket images and encrypts them with the session key. Terminal 50 may then transmit the tickets to the mobile device 10. Tickets may be stored in the mobile device's memory as encrypted and they can only be decoded and viewed by using the relevant session key.

The embodiment according to this invention as shown in FIG. 11 affords various advantages, including the elimination of the need for any scanning/reading devices on the retailer terminal thus reducing equipment cost. This aspect of the invention also maximizes terminal throughput and thus customer satisfaction and lottery revenue. The aspect of this invention shown in FIG. 11 also offers a modern, up-to-date solution for the younger generations of lottery participants.

Also illustrated in FIG. 7 is a lottery server 770, which may include data associated with a lottery game. The lottery server 770 may represent the means by which lottery image tickets sales are reported and registered with the authority running the lottery. The server 770 may also be the source of the application or website used in accordance with this invention. However, the web server by which the mobile device accesses the mobile website or downloads the mobile application may be a different web server than the lottery server 770 with which the retail system 750 communicates to authorize and report the sale of lottery image tickets.

Although the devices 710, 750 are shown connecting to the server 770 by means of the internet 750, it will be understood that any telecommunications system and protocol allowing for the connection of one or more of these systems to the server 770 may be used, including a private or local communications network that is not properly the internet. For example, in some embodiments, a private, non-internet connection may exist between the mobile service network 730 and the server 770. As another example, the retail system 750 may be connected locally or through a secure private connection to the server 770. One of ordinary skill will recognize that services that can connect over the internet can also connect in more localized ways without departing from the scope of this invention, and that specific embodiments wherein the internet is bypassed may still embody the methods and inventions described herein.

Figure 8:
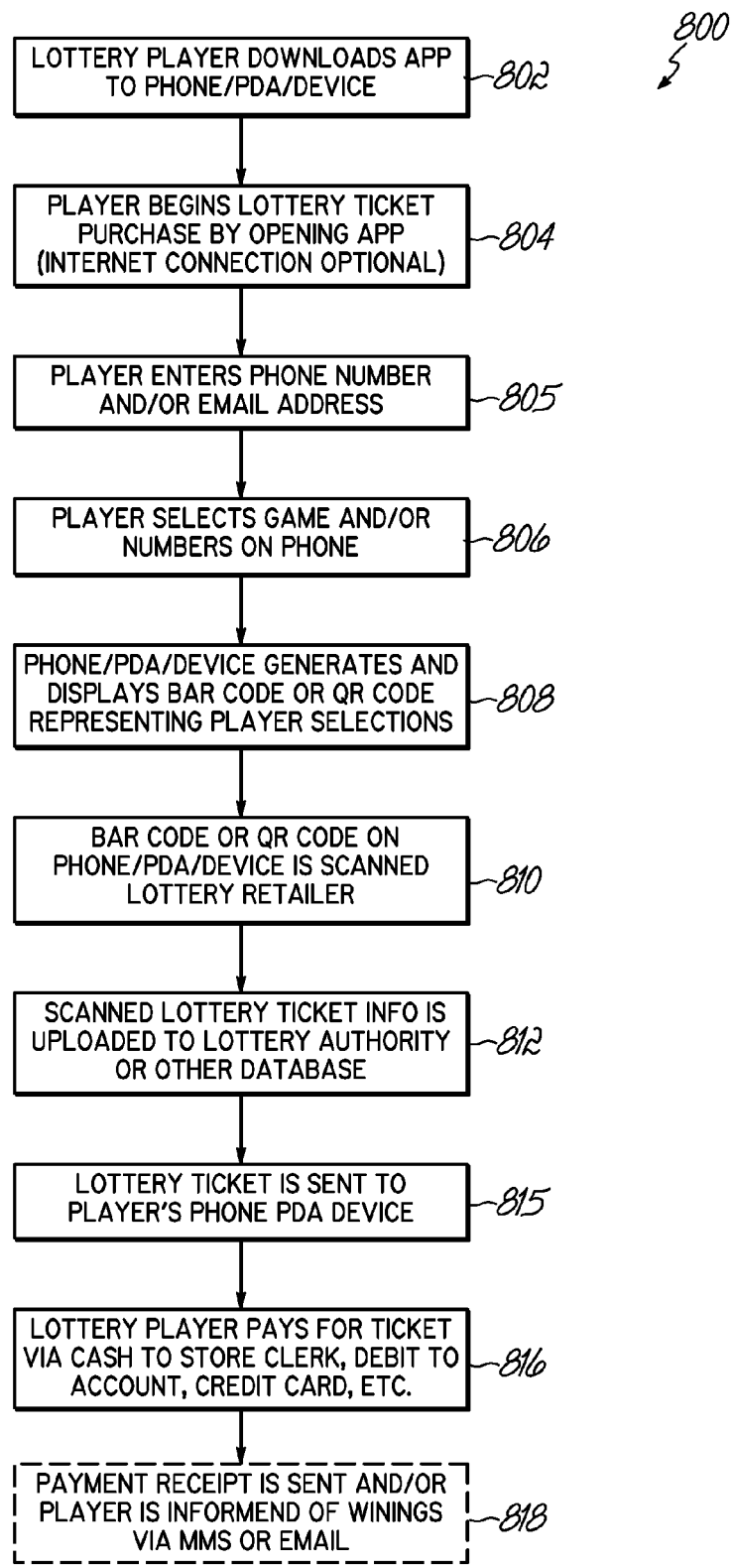
FIG. 8 is a flowchart similar to FIG. 2 representing a process for using a mobile application for purchasing a lottery ticket in accordance with an alternative embodiment of this invention.
Figure 9A:
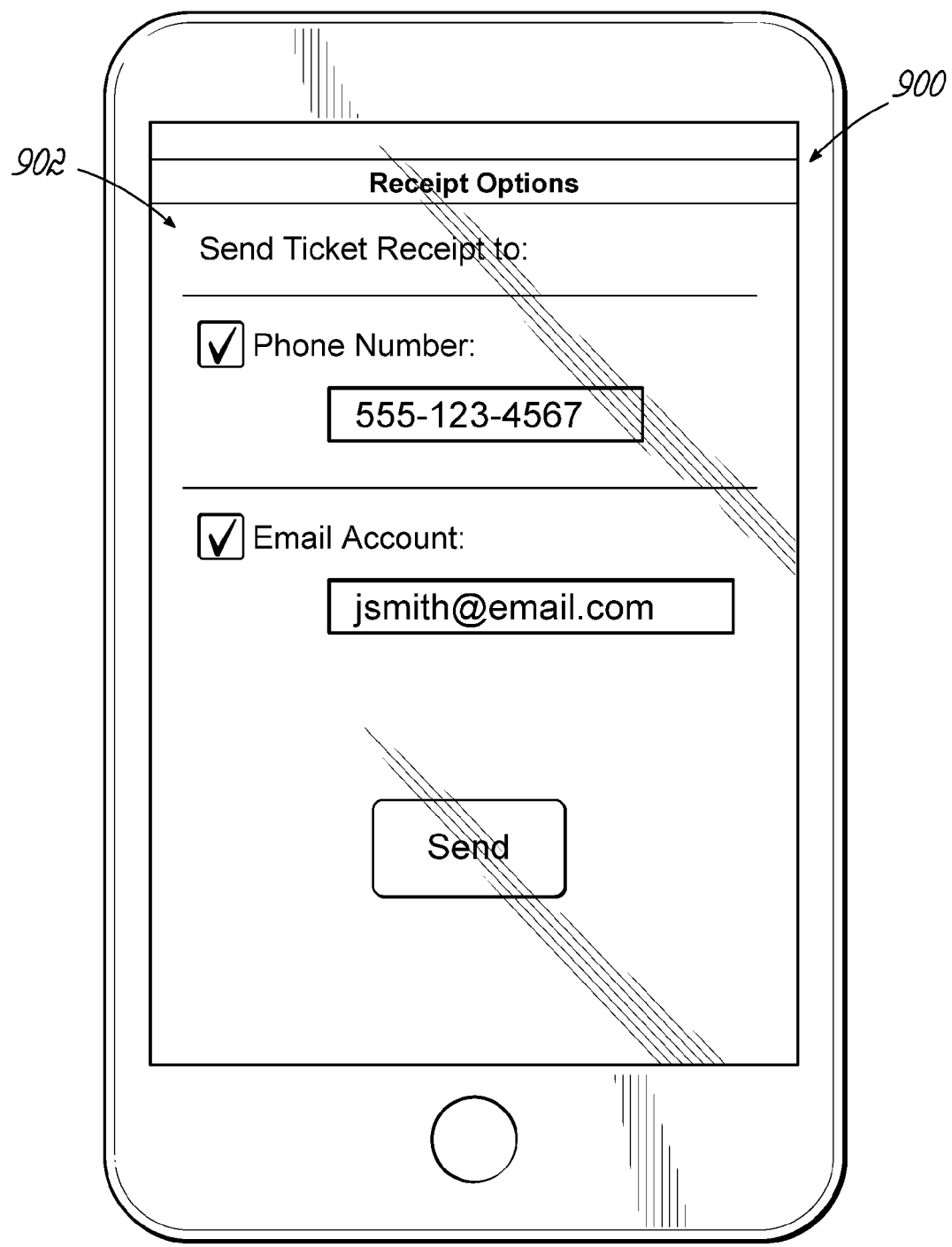
FIGS. 9A-9C show pages associated with the mobile application of FIG. 8.
Figure 9B:
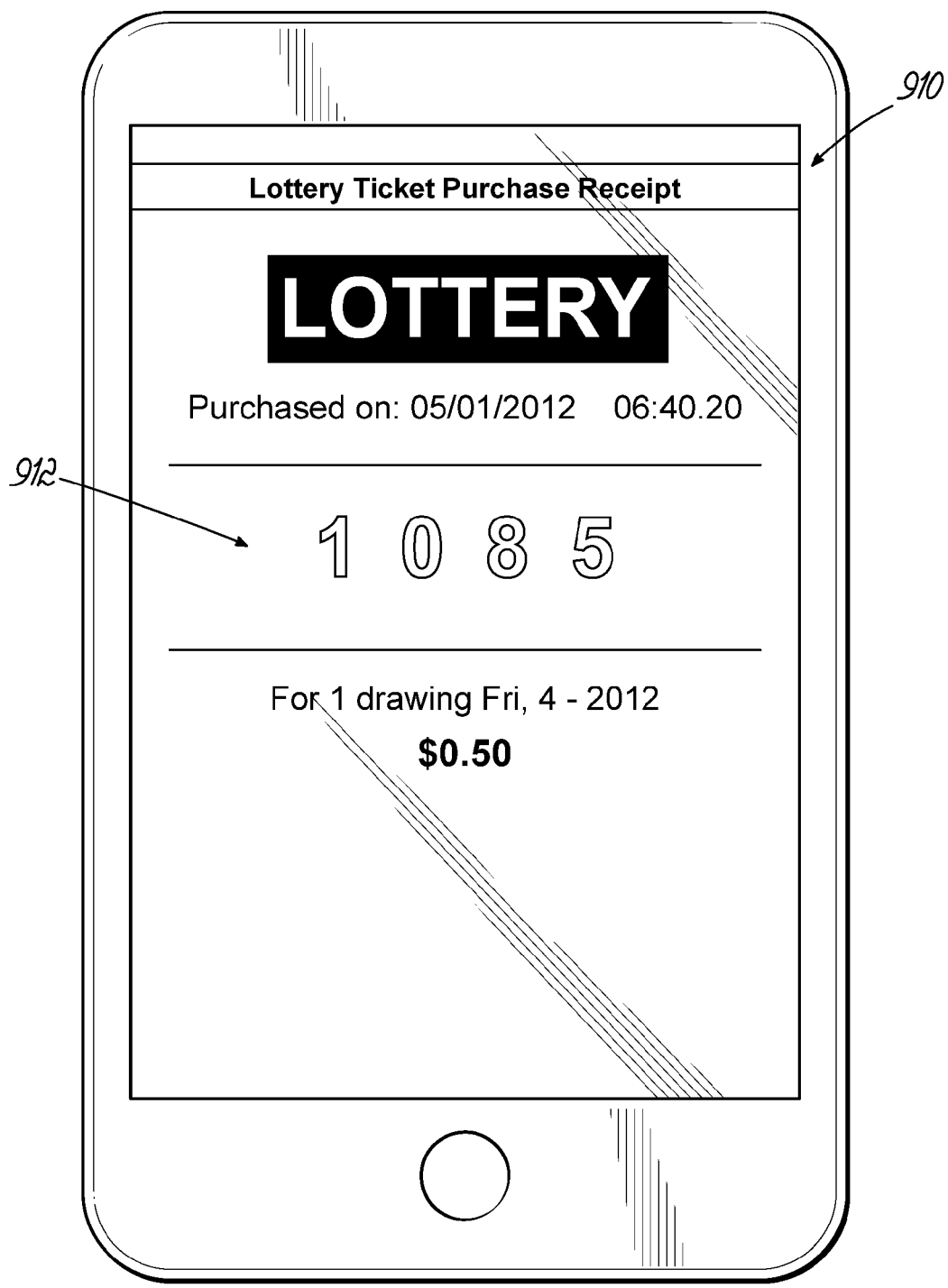
Figure 9C:
Figure 10:
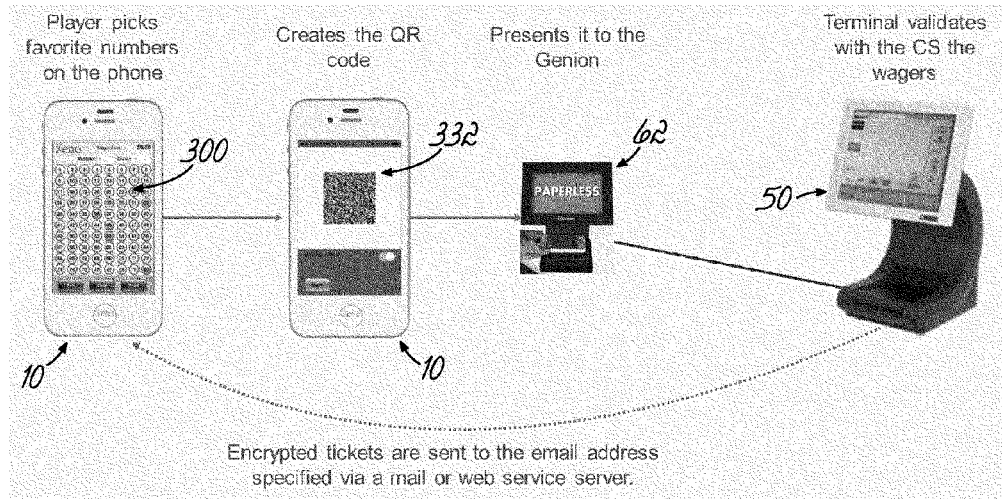
FIG. 10 is a diagram representing a mobile device, scanner and retail system, in accordance with an embodiment of this invention.

An illustration of a method by which a user may play the lottery in accordance with this invention is shown by the flowchart 800 of FIG. 8. Here, a lottery player downloads an application to a mobile device (block 802). The application may be available through an application vending process available through the mobile device's service provider (e.g., an "app store") or otherwise available for download and installation through a website associated with the lottery authority or through a third party website.

Once the application is available on the user's mobile device, the user may later begin the order of a lottery image ticket by first opening the relevant application (block 804). At this point in the process, the application may access the internet and a lottery server (such as the server 770 shown in FIG. 7 above); alternatively, the application may run on the device without connecting to the internet.

Although an introductory or login page may first be displayed (see login page 500 of FIG. 5A above), in one embodiment the application may begin by displaying a favorite games page 300 as shown in FIG. 3A. The games page 300 may include a variety of lottery icons 302, each of which is selected by any means appropriate for the user interface, such as by cursor selection or by touch. Each lottery icon 302 represents a specific lottery game.

The application may initially include a pre-selected set of popular games on the favorites page 300, which can thereafter be customized by the user. In one embodiment, an additional icon 304 below the lottery icons 302 leads the user to an edit page 310 as shown in FIG. 3B. The edit page 310 may include a list 312 of all available games. The list 312 may include checkboxes 314 or other elements of a user interface known in the art that allow the user to designate which games from the list 312 should be displayed on the favorites page 300 and in what order. The edit page 310 may also include a search box 316 allowing the user to search for his favorite games. Navigation icons 318 allow the user to save or discard his or her changes and return to the favorites page 300.

From the favorites page 300, it is also possible to select from the icons 302 in order to enter a page specific to that game. For example, as illustrated in FIGS. 3A and 3C, selection of the "Joker" icon 302 may take the user to the Joker page 320. This page may convey considerable information associated with the Joker lottery game. For example, the necessary selections for the Joker game are displayed in the page windows 322, 324. In this embodiment, five distinct numbers between 1 and 45 must be picked in the first window 322, and a sixth distinct number between 1 and 20 separately selected in the second window 324. Each selection can be made by use of the appropriate numbered icons within each window 322, 324. Alternatively, the use of a "quick pick" button 325 may automatically and randomly make the necessary selections, which could then be further modified by the user. Additional information, for example a price display 326 that may reflect the cost of an image ticket for the selected lottery, may be shown. It will be readily understood that the Joker lottery game is discussed and shown herein merely as an example of one of many types of games compatible with this invention.

If the user is accessing a lottery page for the first time, the application may open to a page with default or random options selected. However, the application may record the user's selections. Each time the user selects a lottery page that the user has previously visited, the page may display the same selections that the user most recently made on that lottery page.

Page 900 may include ticket receipt options 902, which may allow the user to select his or her preferred method of receipt (block 805). The user may choose to enter his or her phone number, for example, so that a lottery image ticket may be transmitted directly to his or her mobile phone. In addition, or alternatively, the user may choose to enter his or her email address, so that a lottery image ticket may be transmitted to his or her email account, which may be accessed through his or her mobile device. Other methods of receipt not shown are also considered, such as transmitting a lottery image ticket to a user's dedicated lottery account, which may be accessed through his or her mobile device.

At the bottom of the page 320, navigation icons 328 may allow the user to return to the previous menu page ("Exit" icon 328), to reset the choices ("Clear" icon 328), or to enter the choices for processing by the app ("Accept" icon 328). Returning to the process illustrated by the flowchart 800 of FIG. 8, if the user chooses to submit the choices for processing (block 806), the mobile device generates a display representing the player's selections (block 808), as illustrated by the page 330 of FIG. 3D. The display page 330 is suited to be read by an optical scanner, and so may include a machine-readable image 332 such as a bar code or QR code, or any suitable data-encoded image as known in the art. Plain text 334 may be displayed as well, representing a code that can be entered into a retail machine if reading the machine-readable image 332 fails as the result of the malfunctioning, misuse, or absence of an optical scanner.

In one embodiment, the machine-readable image may represent a code that is a string of alphanumeric characters that are generated by an algorithm contained within the mobile device application and relate directly to the selections made by the operator. In the example shown in FIG. 3D, as shown by the plain text 334, the string is as simple as the game name followed by the selections made. Other encoding schemes known to both the retail system and the mobile application are possible.

FIGS. 3E and 3F show another example of a lottery page 340 and resulting code display page 350, this time for a "KENO" lottery game in which eight numbers are selected from 1 to 80. A window 342 is used to select the numbers, and as above, subsequently accessing the same page 340 may result in the previous selections being made as the default. Text entry boxes 344 allow a user to select a number of draws and a multiplier, each of which may increase the price of the ticket order as displayed at 346 below. As before, navigation icons 348 allow the user to accept the selected values or return to a previous menu page.

The display page 350 shows another embodiment of a machine readable image 352, which is a barcode image of any appropriate standard or non-standard encoding scheme. Again, a text representation 354 may accompany the barcode image 352.

After the machine-readable image 332 or 352 is scanned (block 810), a lottery image ticket order can be submitted by the retail system 750 to the lottery server 770, which authorizes the retail system 750 to send one or more lottery image tickets according to established rules and procedures (block 812). In a first embodiment, the retail system 750 has the capability to decode the machine-readable image 332 or 352 to determine the player's selections. As noted above, the player's selections are converted into the machine-readable image 332 or 352. The retail system 750 may determine how each aspect of the machine-readable image 332 or 352 translates to the player's selections when decoding the machine-readable image 332 or 352.

In a second embodiment, the decoding of the machine-readable image 332 or 352 may be limited to the server 70 so that other devices, such as the retail system 750 and/or the mobile device 10, do not have the capability to decode the machine-readable image 332 or 352. As noted above, limiting the capability to decode the machine-readable image 332 or 352 to the server 70 provides additional security preventing unauthorized hackers from accessing the decoded machine readable image 332 or 352 via the mobile device 10 and/or the retail system 750.

After the machine-readable image 332 or 352 has been successfully scanned, a lottery ticket image order may be generated by the retail system 750 and be submitted to the lottery server 770. The lottery server 770 may then authorize the retail system 750 to send one or more lottery image tickets according to the established rules and procedures (block 812). The ordered image tickets 912 are sent to the player's mobile device and displayed on page 910 through an email, MMS, or similar transmission (block 815), depending on the preferred method selected by the player (block 805). The order is paid for (block 816) in accordance with known procedures for lottery retail. A payment receipt may be sent to the player's mobile device in an MMS or email for proof of purchase (block 818). A notification of winnings 922 may also be sent to the player's mobile device in a similar manner, and may be displayed on screen 920.

Redemption of the player's winnings may begin with the player going to the retailer and presenting his electronic ticket as shown on page 910 with the barcode. Next, the barcode is scanned by the retailer's optical scanner. Similar to the procedure followed for the paper tickets, the retailer's computer communicates with the host system for verification of the winnings and then the retailer may remit the payment to the player. This is an important step in the paperless embodiment of this invention as no paper ticket is required for the winnings redemption even to players that do not have a lottery account.

As an alternative to an executed application, the same functions described above, as well as additional functions convenient for a lottery, may be accessed by means of a mobile website.

It will be understood that, as with the application illustrated with screenshot in FIG. 3A-3F above and block 208 from flowchart 200 of FIG. 2, the resulting machine-readable image code may represent the image ticket order directly, and may be decodable by means of a retail machine without access to a lottery server.

Although certain features of this invention are illustrated above with an embodiment that is a mobile application and others with an embodiment that is a mobile website, it will be understood that the features described therein are not limited to one or the other of these embodiments. One of ordinary skill in the art will recognize that features from each illustrated embodiment could be combined, and that all features of the mobile website could be implemented as part of an application, and the features of the application implemented within a mobile website.

From the above disclosure of the general principles of this invention and the preceding detailed description of at least one embodiment, those skilled in the art will readily comprehend the various modifications to which this invention is susceptible. Therefore, we desire to be limited only by the scope of the following claims and equivalents thereof.

We claim:

1. A method of filling an order for a lottery image ticket, comprising:

displaying a machine-readable code image on a mobile device to identify a code associated with a ticket order, wherein the machine readable code image is associated with a lottery server that generated the ticket order and is initially displayed by the mobile device in response to selections made on the mobile device by a purchaser of the lottery image ticket;

wirelessly communicating between the mobile device of a user, the lottery server and a lottery retailer to identify the code represented by the machine-readable code image and representing the ticket order for a lottery ticket including at least one player selection;

receiving, from the lottery server, information associated with the ticket order after the lottery server decodes the machine-readable code image, wherein the mobile device and/or the lottery retailer is incapable of decoding the machine-readable code image; and selling the lottery image ticket having player selections matching the player selections included in the order.

2. The method of claim 1, wherein the wirelessly communicating step is accomplished via a Bluetooth protocol or other known protocol for use with a mobile device.

3. The method of claim 1, further comprising:

transmitting a lottery image ticket consistent with the order to at least one of the purchaser's mobile device and an online account which can be accessed through the purchaser's mobile device.

4. The method of claim 3, further comprising:

transmitting a payment receipt to at least one of the purchaser's mobile device and an online account which can be accessed through the purchaser's mobile device.

5. The method of claim 4, further comprising:

transmitting a notification of winnings related to the order to at least one of the purchaser's mobile device and an online account which can be accessed through the purchaser's mobile device.

6. The method of claim 1, further comprising:

communicating with a lottery system, the lottery system tracking and authorizing the sale of lottery image tickets.

7. A lottery image ticket retail system, comprising:

an optical scanner configured to read a machine-readable code image displayed on a lottery player's mobile device, wherein the machine-readable code image is generated by a lottery server and the machine-readable code image is representative of selections made on the mobile device; and a computer configured to:

receive a code represented by the machine-readable code image after the machine-readable code image on the mobile device is scanned by the optical scanner, associate the received code with an order for a lottery image ticket and at least one player selection for that lottery image ticket, receive from the lottery server information associated with the order after the lottery server decodes the machine-readable code image, wherein the mobile device and the computer is incapable of decoding the machine-readable code image, and;

communicate a sale of a lottery image ticket corresponding with the order to a lottery authority server.

8. The retail system of claim 7 wherein the computer is further operable to transmit at least one of a lottery image ticket corresponding with the order, a payment receipt, and a notification of winnings to at least one of a purchaser's mobile device and an online account which can be accessed through a purchaser's mobile device.

9. A method for generating a lottery image ticket order, comprising:
    generating and displaying a user interface allowing a player to make player selections associated with a lottery image ticket;
    receiving input from a player corresponding to the player selections for the lottery image ticket;
    displaying a machine-readable code image on a mobile device representing an order for the lottery image ticket including the player selections, wherein the machine-readable code image is associated with a lottery server that generated the order and is initially displayed by the mobile device in response to selections made on the mobile device by the player that purchased the lottery image ticket; and
    receiving, from the lottery server, information associated with the ticket order after the lottery server decodes the machine-readable code image, wherein the mobile device is incapable of decoding the machine-readable code image.

10. The method of claim 9, further comprising:
    recording the player selections; and
    when subsequently generating and displaying the user interface for the same type of lottery image ticket, generating and displaying the recorded selections.

11. The method of claim 9, further comprising:
    installing a mobile application on a mobile device;
    executing the mobile application, the mobile application carrying out the steps of generating and displaying the user interface, receiving input from the player, and generating and displaying the machine-readable code image.

12. The method of claim 9, further comprising:
    accessing a mobile website from an internet client on a mobile device;
    displaying a first web page associated with the mobile website, the first web page including the user interface;
    communicating data associated with the input from the player to a web server; and
    displaying a second web page associated with the mobile website, the second web page including the machine-readable code image.

13. A method for facilitating and tracking a lottery image ticket order, comprising:
    receiving user information uniquely identifying a user;
    receiving lottery image ticket order information including player selections associated with the lottery image ticket;
    generating, by a lottery server, a unique machine-readable code image associated with the lottery ticket order information and the user information in response to selections made on a mobile device by the user;
    receiving the machine-readable code image after the machine-readable code image is read by a lottery retail system;
    decoding the machine-readable code image after the machine-readable code image is read by the lottery retail system to determine the lottery ticket order information including the player selections and the user information as represented by the machine-readable code image that is read by the lottery retail system, wherein the mobile device and/or the lottery retail system is incapable of decoding the machine-readable code image;
    upon decoding the unique machine-readable code image, associating a lottery image ticket with the user, the lottery image ticket corresponding with the lottery ticket order information and the user information; and
    subsequently reporting the status of the lottery image ticket to the user.

14. A method of selling a lottery image ticket comprising the steps of:
    prompting a user to install an application on a mobile device that receives lottery game selection information from the user and displays a machine-readable code image on the mobile device representative of the lottery game selection information;
    scanning the machine-readable code image displayed on the mobile device by a lottery retailer system to identify a code associated with a lottery server that generated a ticket order associated with the lottery game selection information;
    receiving the code represented by the machine-readable code image after the machine-readable code image is read, wherein the code represents the ticket order associated with the lottery game selection information;
    receiving, from the lottery server, the lottery game selection information associated with the ticket order after the lottery server decodes the machine-readable code image, wherein the mobile device and/or the lottery retail system is incapable of decoding the machine-readable code image;
    selling the lottery image ticket to the user consistent with the lottery game selection information; and
    communicating the sale of the lottery image ticket to a lottery authority.

15. The method of claim 14, further comprising:
    transmitting the lottery image ticket to at least one of the user's mobile device and an online account which can be accessed through the user's mobile device.

16. The method of claim 14 further comprising:
    redeeming a winning lottery image ticket by the lottery retailer scanning the lottery image ticket.

* * * * *